US009652287B2

(12) United States Patent
van Gulik et al.

(10) Patent No.: US 9,652,287 B2
(45) Date of Patent: May 16, 2017

(54) USING DATABASES FOR BOTH TRANSACTIONS AND ANALYSIS

(71) Applicant: Miosoft Corporation, Madison, WI (US)

(72) Inventors: Mark D. A. van Gulik, Madison, WI (US); Todd Lyle Smith, Madison, WI (US); Jordan Paul Barrette, Madison, WI (US); Albert B. Barabas, Madison, WI (US); Ernst M. Siepmann, Pembroke Pines, FL (US)

(73) Assignee: Miosoft Corporation, Madison, WI (US)

(*) Notice: Subject to any disclaimer, the term of this patent is extended or adjusted under 35 U.S.C. 154(b) by 0 days.

(21) Appl. No.: 14/589,379

(22) Filed: Jan. 5, 2015

(65) Prior Publication Data
US 2016/0196163 A1 Jul. 7, 2016

(51) Int. Cl.
*G06F 17/30* (2006.01)
*G06F 9/48* (2006.01)

(52) U.S. Cl.
CPC ...... *G06F 9/4881* (2013.01); *G06F 17/30345* (2013.01)

(58) Field of Classification Search
CPC .................. G06F 9/4881; G06F 17/30345
See application file for complete search history.

(56) References Cited

U.S. PATENT DOCUMENTS

| 7,587,428 | B2 | 9/2009 | Barabas et al. | |
| 7,689,560 | B2 | 3/2010 | Barabas et al. | |
| 8,170,981 | B1* | 5/2012 | Tewksbary | 707/600 |
| 8,489,567 | B2 | 7/2013 | Barabas et al. | |
| 8,935,225 | B2 | 1/2015 | Barabas et al. | |
| 2010/0153397 | A1 | 6/2010 | Barabas et al. | |
| 2013/0073513 | A1* | 3/2013 | Kemper et al. | 707/600 |
| 2013/0191434 | A1 | 7/2013 | Smith et al. | |
| 2014/0279942 | A1* | 9/2014 | Siepmann et al. | 707/690 |
| 2014/0280398 | A1* | 9/2014 | Smith et al. | 707/825 |
| 2014/0282600 | A1* | 9/2014 | Siepmann et al. | 718/106 |
| 2014/0380322 | A1* | 12/2014 | Ailamaki | G06F 9/4843 718/102 |

OTHER PUBLICATIONS

Kemper et al., "HyPer: A Hybrid OLTP&OLAP Main Memory Database System Based on Virtual Memory Snapshots", ICDE Conference 2011, pp. 195-206, 2011, IEEE.*

(Continued)

*Primary Examiner* — Leslie Wong
(74) *Attorney, Agent, or Firm* — Fish & Richardson P.C.

(57) ABSTRACT

Among other things, requests are received for tasks to be performed in a database. The tasks include tasks that will cause changes in data of the database and other tasks that must be executed on data in the database that is consistent time-wise. At least some of the data that will be changed by the change-causing tasks comprises data that must remain time-wise consistent for the other tasks. The other tasks are executed in the database while the change-causing tasks are also being executed in the database, without requiring a replication or reconfiguration of the database.

17 Claims, 16 Drawing Sheets

(56) References Cited

OTHER PUBLICATIONS

Figure 1:
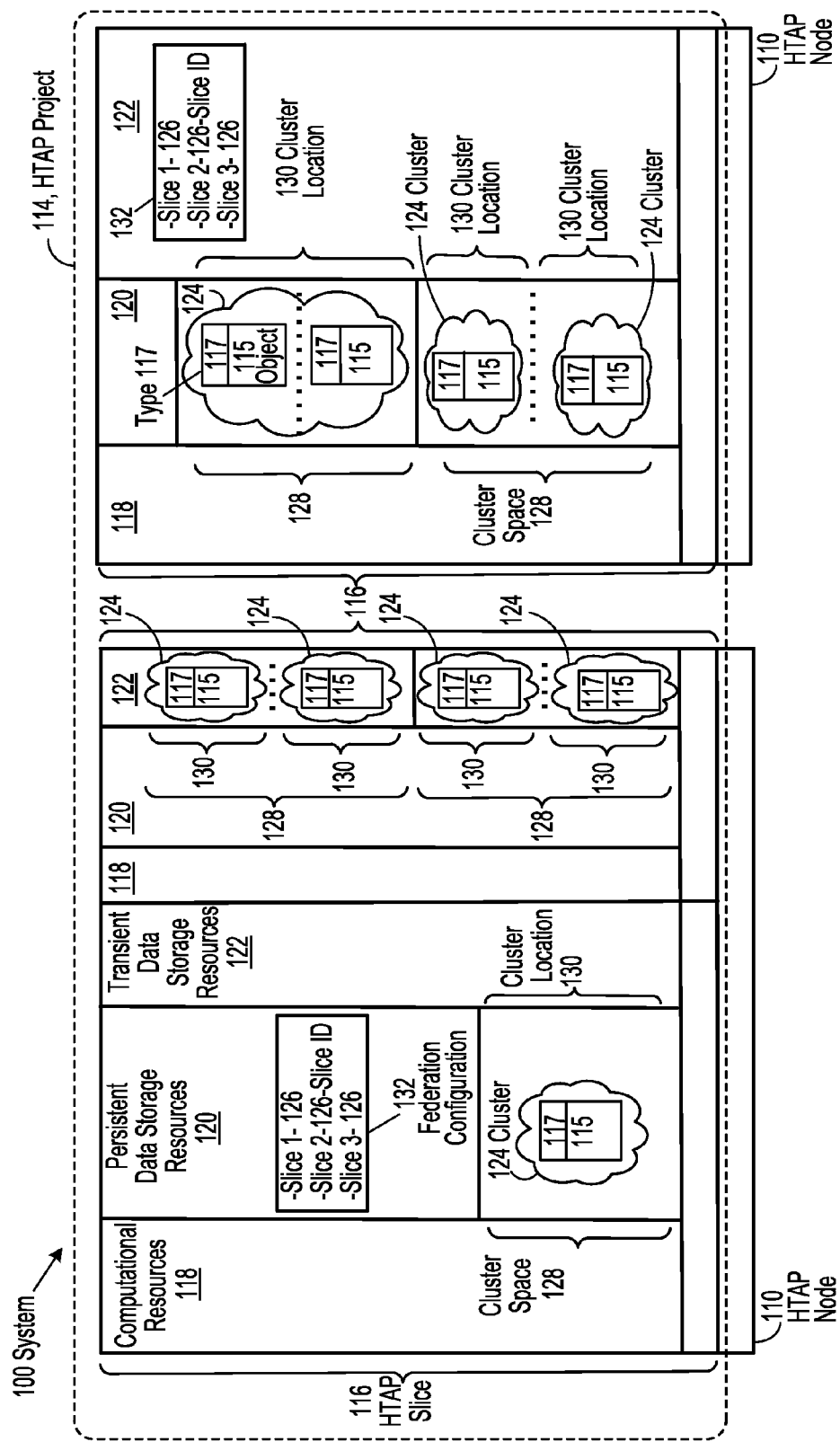

Rybak, "Problems With Storing Temporal Data", Zeszyty Naukowe Politechniki Bialostockiej 2007, Bialystok Technical University, Faculty of Computer Science, pp. 121-140, 2007.*
Bebel et al., "Creation and management of versions in multiversion data warehouse", Proceedings of the 2004 ACM symposium on Applied computing, pp. 717-723, 2004, ACM.*
Pavlo, "Emerging Hardware Trends in Large-Scale Transaction Processing", IEEE Internet Computing, vol. 19, Issue 3, pp. 68-71, May-Jun. 2015, IEEE.*
Plattner, Hasso, "A Common Database Approach for OLTP and OLAP Using an In-Memory Column Database," *SIGMOD '09*, Proceedings of the 2009 ACM SIGMOD International Conference on Management of data, Jun. 29-Jul. 2, 2009, Providence, Rhode Island, USA, 7 pages.
U.S. Appl. No. 09/687,268, filed Oct. 13, 2000, Barabas et al.
U.S. Appl. No. 09/687,941, filed Oct. 13, 2000, Siepmann et al.
Bailey-Borwein-Plouffe formula, Wikipedia [online], [retrieved on Aug. 4, 2015]. Retrieved from the Internet: http://en.wikipedia.org/wiki/Bailey%E2%80%93Borwein%E2%80%93Plouffe_formula.
Extensible Markup Language (XML) [online], [retrieved on Aug. 4, 2015]. Retrieved from the Internet: http://www.w3.org/XML/.

\* cited by examiner

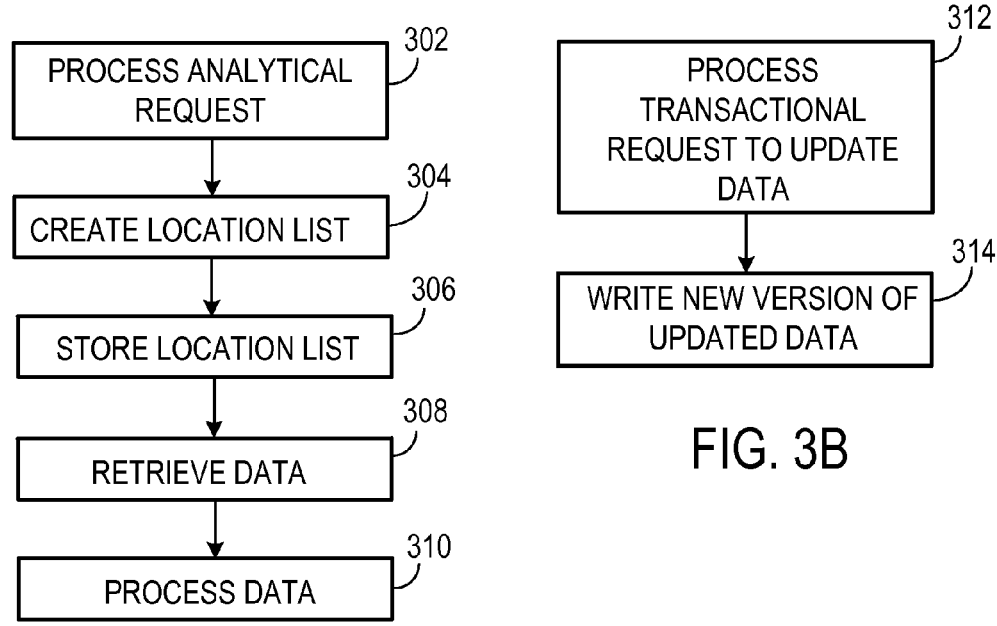

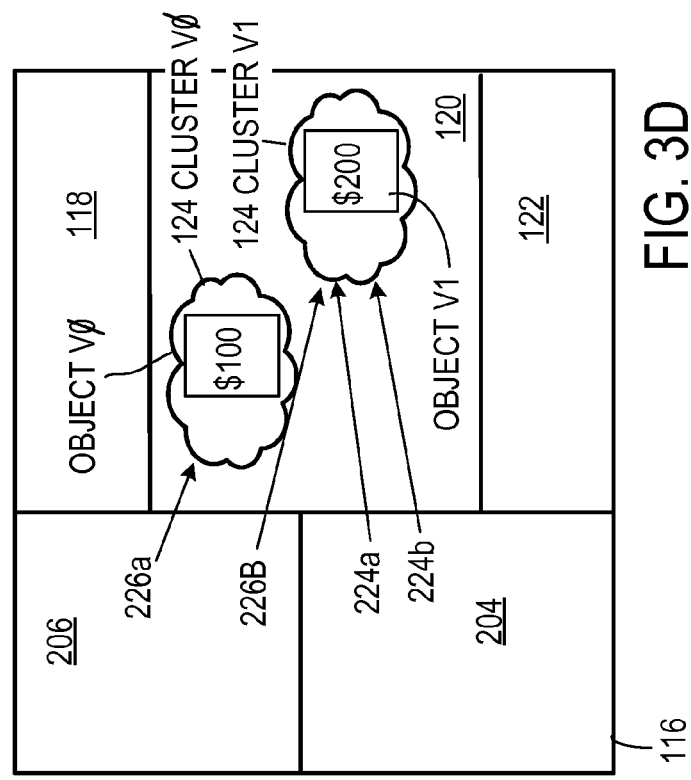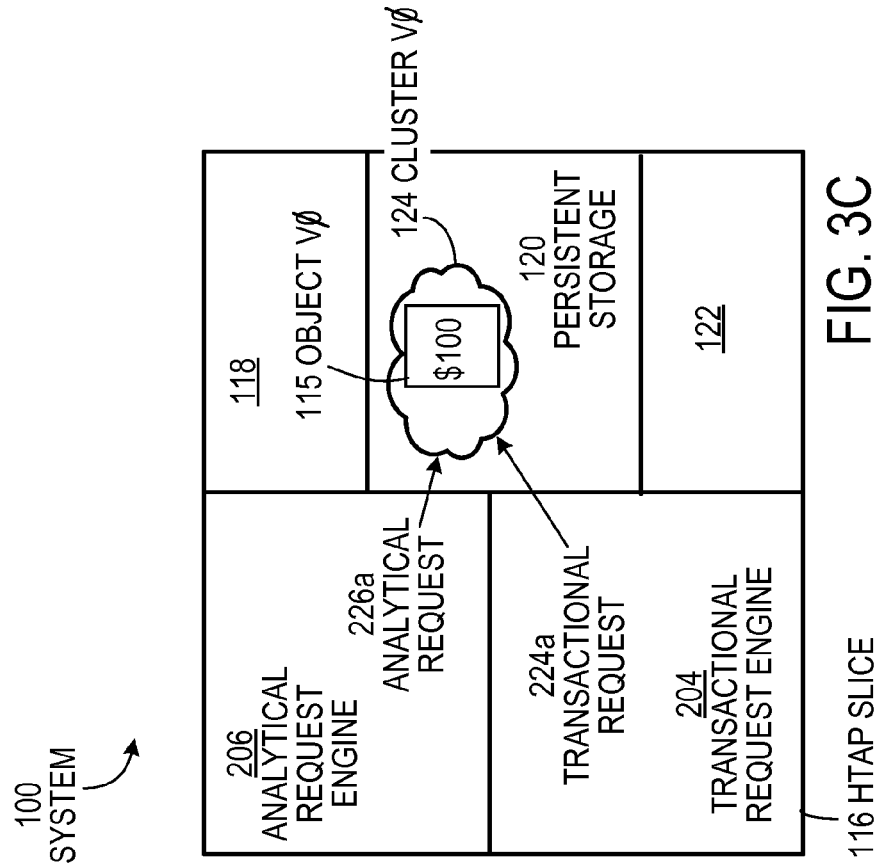

```
<federation>                                              ——720                    Federation Configuration
    <name>AProjectName</name> ——722                                                   Structured Format
    <slices> ——724
        <slice> ——726
            <id>1</id> ——728
            <nodeName>node1.miosoft.com</nodeName> ——730
            <clientServiceHandle> ——732
                                                                             ——740
                <mioplexerName>node1.miosoft.com</mioplexerName>
                <tcpPort>13697</tcpPort> ——742
                <serviceHandleID>1</serviceHandleID> ——744
            </clientServiceHandle>
            <beginningClusterSpace>0</beginningClusterSpace> ——734
            <endingClusterSpace>33554431</endingClusterSpace> ——736
            <persistentStoragePath>C:\Databases1</persistentStoragePath>
        </slice>                                                                                  738
        <slice> ——726
            <id>2</id> ——728
            <nodeName>node1.miosoft.com</nodeName> ——730
            <clientServiceHandle> ——732
                                                                              740
                <mioplexerName>node1.miosoft.com</mioplexerName>
                <tcpPort>13697</tcpPort> ——742
                <serviceHandleID>2</serviceHandleID> ——744
            </clientServiceHandle>
            <beginningClusterSpace>33554432</beginningClusterSpace> ——734
            <endingClusterSpace>67108862</endingClusterSpace> ——736
            <persistentStoragePath>C:\Databases1</persistentStoragePath>
        </slice>                                                                                  738
        <slice> ——726
            <id>3</id> ——728
            <nodeName>node2.miosoft.com</nodeName> ——730
            <clientServiceHandle> ——732
                                                                              740
                <mioplexerName>node2.miosoft.com</mioplexerName>
                <tcpPort>13697</tcpPort> ——742
                <serviceHandleID>3</serviceHandleID> ——744
            </clientServiceHandle>
            <beginningClusterSpace>67108863</beginningClusterSpace> ——734
            <endingClusterSpace>268435455</endingClusterSpace> ——736
            <persistentStoragePath>C:\Databases1</persistentStoragePath> ——738
        </slice>
    </slices>
</federation>                                                         FIG. 7A
```

USING DATABASES FOR BOTH TRANSACTIONS AND ANALYSIS

BACKGROUND

This description relates to using databases for both transactions and analysis.

As access to and collection of new types of data becomes more prevalent, new technologies are required to store and provide functionality around those data such that software applications can leverage the data in meaningful ways. In a business where new types of data create interest in and the potential for new, increasingly sophisticated applications, these technologies are needed to deliver value and stay competitive through both customer facing applications and internal applications (for instance, those for use by the business in its strategic and operational activities).

Databases can be used for transactional purposes or for analytical purposes. Traditionally, independent markets have emerged to promote different architectures and technologies to serve respectively analytical and transactional workloads.

SUMMARY

In general, in an aspect, requests are received for tasks to be performed in a database. The tasks include tasks that will cause changes in data of the database and other tasks that must be executed on data in the database that is consistent time-wise. At least some of the data that will be changed by the change-causing tasks comprises data that must remain time-wise consistent for the other tasks. The other tasks are executed in the database while the change-causing tasks are also being executed in the database, without requiring a replication or reconfiguration of the database.

Implementations may include one or a combination of any two or more of the following features. The tasks are executed on data located at two or more different nodes of the network. The tasks are executed using two or more processes running at two or more different nodes connected by communication links. The portion of the data is stored in transient memory. The change-causing tasks are executed with relatively lower latency. The other tasks are executed with relatively higher latency. The change-causing tasks include transactional tasks. The other tasks include analytical tasks. Executing the other tasks while the change-causing tasks are being executed includes persistently maintaining time-wise consistent versions of given data as the change-causing tasks cause changes in the given data. Executing the other tasks includes reliably locating the time-wise consistent versions of data on which the other tasks are to be executed. Time consistent versions of the given data are removed when the time-wise consistent versions are no longer needed for any of the other tasks. The data in the database is stored persistently. The two different items of the data are stored in two different non-conflicting regions or two different physical clusters. A relationship is maintained between the two different items of data, the relationship enabling a process that is executing one of the tasks to reach any one of the data items from the other data item. The consistency of the relationship is maintained notwithstanding updates of either or both of the data items. The tasks have competing requirements for use of regions of the database. Each of the regions includes data that is all either locked or not locked for writing at a given time. Each of the regions is associated with an available processor. For each of the tasks, jobs are defined each of which requires write access to regions that are to be accessed by no more than one of the processors. The jobs are distributed for concurrent execution by the associated processors. Each of the tasks is completed with a certainty that is at least as high as the certainty that updated in a requested database transaction is not lost once the transaction is committed. The tasks relate to commercial transactions.

In general, in an aspect, analytical tasks are executed on data of a database that is expressed according to a schema that is natively suited to online transaction processing. The analytical tasks are executed without requiring any transformation of the schema according to which the data is expressed.

Implementations may include one or a combination of any two or more of the following features. The schema conforms to an expressive semantic model that is of an arbitrarily high level of expressiveness. The tasks are executed on data located at two or more different nodes of the network. The tasks are executed using two or more processes running at two or more different nodes connected by communication links. The data is stored in transient memory. Executing the analytical tasks includes accessing versions of the data that are time-wise consistent and stored in accordance with the schema of the database.

In general, in an aspect, an analytical task is executed using data of a database. The data to be used by the analytical task is subject to changes made by transactional tasks to be performed after the beginning of the executing of the analytical task and before the completion of the executing of the analytical task. Time-wise consistency of the data used by the analytical task in executing the database is guaranteed notwithstanding the changes made by the transactional tasks.

Implementations may include one or a combination of any two or more of the following features. The data of the database is distributed among nodes of the network. Guaranteeing the time-wise consistency includes assuring access by the analytical task to time-wise consistent data stored persistently in the database at known locations. The tasks are executed on data located at two or more different nodes of the network. The tasks are executed using two or more processes running at two or more different nodes connected by communication links.

In general, in an aspect, if at least part of a relatively shorter latency operation is in contention with at least part of a relatively longer latency operation for access to data stored persistently at a node of a distributed database, the longer latency operation is temporarily suspended while at least the part of the shorter latency operation proceeds. The longer latency operation requires access to the data in its state as of a particular moment in time. If data in its state as of the particular moment in time is to be changed by the shorter latency operation while the longer latency operation is suspended, then the changed data is stored as a new version persistently at the node, without making the unchanged data inaccessible to the longer latency operation. The longer latency operation is permitted to resume and to access the unchanged data in its state as of the particular moment in time.

These and other aspects, features, and implementations, and combinations of them, can be expressed as methods, apparatus, systems, components, methods of doing business, program products, abstract ideas, means or steps for performing functions, and in other ways.

These and other aspects, features, implementations, and advantages will become apparent from the following description including the figures, and from the claims.

DETAILED DESCRIPTION

FIGS. 1, 1A, 2, 3C, 3D, 4, 6, 7, and 8-10 are block diagrams.

FIGS. 3A, 3B, 5, and 11-13 are flowcharts.

FIG. 7A is a structured data format.

Here we describe systems that can be implemented to enable both transactional and analytical workloads to be served by the same system.

Serving both types of workloads in the same system promises to reduce costs and to increase the relevance of analytics by enabling the analytics to be applied to the operational data when it is in as close to a current state as possible. Reducing latency (e.g., the delay between the time when the data is generated, say, when a transaction occurs, and the time when the data can be used by the analytics, say, to determine whether a customer has engaged in two similar transactions within a few minutes) enables traditional, descriptive analytics, to be more reflective of the current state of the business. It also enables new types of analytics, such as predictive analytics and prescriptive analytics, by virtue of an architecture that allows transactions and analytics both to be processed in the same system. Hardware and software costs can be reduced because of the reduced need for redundant copies of the data and auxiliary components related to the synchronization of separate transactional and analytical systems. In addition, operational costs are reduced, both directly through reduced utilities and facilities costs, and indirectly through reducing the total amount of knowledge and expertise required of operations personnel.

For example, consider a financial institution's customer facing application that allows a particular customer to transfer money between accounts. For this application a simplified use case would involve a transaction that executes and records two operations: first, the exact amount of the transfer is withdrawn from one account, and second, that amount is deposited into the other account. Similarly, the financial institution may wish to add to that customer facing application features that allow the customer to perform interactive, ad-hoc analysis of the transactions that have taken place on the customer's accounts. Additionally, the institution likely will want thousands or, for certain large-scale applications, even millions of users to be able to simultaneously access the system. Transactional systems are often also operational, that is the operations of a business depend on their use. The value of the application for the business, however, is not usually in how it is implemented. The value is in the business purpose it serves; in this case, allowing potentially millions of customers to simultaneously transfer money between accounts.

A typical business need is to perform analytics on the operational data to create high-level overviews of the operational state of the business. For instance, a business analyst may want to ask simple questions about the operational data such as "What are the amounts deposited in each account" or more involved questions like "What is the risk of default for all customers", where risk requires a complex computation. Adding this kind of traditional descriptive analytics and aggregation to a system, however, is not necessarily trivial. In many cases, especially for systems of millions of records or more, there is a need for efficiently performing system wide scans of the database for records that have particular values, such that aggregation of or calculating statistics can be performed for those values. It is useful in such a system to minimize contention among users and applications for use of the database, such that clients of the transactional component experience acceptable delays and operations are completed prior to timing out.

Application developers who design applications with business value in mind are also likely to want access to an increasing number of new sources of data as they become available. Traditional business data, social data, public data, purchased data, and sensor data all can provide value to the application, and can provide potential competitive advantages to those businesses that can leverage it first. Using this data in a meaningful way can require systems to connect to, integrate, relate, affect, and analyze these data within the context of the business.

It is useful for such a system to take into account the desire to perform, at some level, both transactions and analytics in the same system. One way to perform both, while taking advantage of the varying data, is to contextually cluster the data so that related and relevant information is clustered together when stored, and as few operations as possible are needed to a) retrieve or update all information needed to make a decision based on incoming data or b) perform analysis of existing data ad-hoc. When a transaction is performed in the example above, the system should be able to quickly determine the customer the transaction is related to, retrieve the customer-defined value, and send the alert. This can be achieved if the data is clustered so that relatively few expensive operations (disk seeks, bulk transfers, encoding/decoding) need be performed in the system to complete the transaction.

It is also useful for such a system to take into account the increasing complexity, volume, speed, and variety of data that is available, as well as information that is computed in-part from static data and in-part from changing data.

Here we describe systems, techniques, and implementations that allow transactional and analytical computation to be performed efficiently in the same database, among other things, by leveraging clustering of the data, by enabling transactions and analytics to both be serviced by a sophisticated request mechanism, and by enabling scanning of the database and computation over the retrieved data at a lower priority while continuing to allow updates to the system.

We sometimes refer to examples of systems of the kind that we describe here as hybrid transactional/analytic processing systems or as "unified systems" and sometimes as "HTAP systems" interchangeably. One goal of such systems is to support both low-latency transactions (those for which the time between when a request to commit a transaction is received and the time when the transaction has been committed in the system must typically be brief such that confirmation can be given to the requestor in a short amount of time after the request has been made) and potentially high-latency, long response time analytics (for which the acceptable time between a request for an analytics operation being received and the time when it has been completed is relatively longer) while maintaining unified persistent data storage and computation such that these workloads can be performed without maintaining two separate copies of the persistent data, one for each purpose, and such that the requestor of an analytical or transactional operation need only submit the request to one place.

We use the phrase low-latency broadly to include, for example, any time period that is short enough to satisfy the needs of an end user of the system, such as a customer, for example, shorter than 10 seconds, shorter than 5 seconds, shorter than a 1 second, or shorter than a fraction of a second.

We use the phrase high-latency broadly to include, for example, a time period that is not so long as to cause an unacceptable delay between the time when data is generated and the time when the result of an analytics operation based on the data is generated. In some cases, high-latency could mean no longer than a week, a day, an hour, 10 minutes, 5 minutes, 1 minute, or less than a minute. In some cases, high-latency analytics and low-latency transactions may have similar or overlapping latency constraints.

We use the phrases analytics and analytical broadly to include, for example, complex operations that typically include read-only operations on large amounts of data. As examples, the operations could be retrieving all bank accounts with activity in the last five minutes from a database of hundreds of millions of bank accounts, retrieving all customers with a credit score of greater than 700 from a database of millions of customers, and retrieving all bills with an outstanding balance of at least $10 from a database of billions of bills.

We use the phrase persistent data or persistently stored data broadly to include, for example, data that is stored in such a way that it can reliably be expected to be available indefinitely or for any arbitrarily long period of time. We use the term storage broadly to include, for example, locations capable of holding data, for example, high-speed memory, flash memory, flat file, or disk. Roughly speaking, transactions are fairly small operations that typically can be completed in seconds at most because they are operating on small amounts of data, whereas an analytical function may take quite some time, especially for a system with a large amount of data, since it involves retrieving a potentially large subset of that data in the system and also potentially performing some computation. We use the phrase small operations broadly to include, for example, operations that operate on quickly retrievable data, for example, data that is locatable and retrievable within seconds. We use the phrase small amounts of data broadly to include, for example, atomic items, for example, an account number. We use the phrase quite some time broadly to include, for example, an amount of time such that the system seems to be not interactive. By way of contrast, when a user of a web browser clicks on a button on a webpage, the user expects to get near immediate feedback, within seconds at the longest, which is typically not quite some time. We use the phrase large amount of data broadly to include, for example, a terabyte or more of data. For example, an analytical function can involve computing or searching over a large amount of data, e.g., a gigabyte or terabyte or more, to test whether a large subset of all the atomic items in the database meet certain criteria or compute some aggregate from those items.

Generally transactions update or add data in the system, while analytics use data but do not change it. When analytics operations are using data in the database, whether a proper subset of data in the database or all data in the database, other operations including transactions are typically blocked from changing the data. Since transactions affect the data, an important challenge is maintaining a consistent view of the entire set of data in the database while an analytical operation is running, without increasing the latency required to complete a transaction because the analytical operation is blocking the execution of the transaction. We use the term consistent or consistency broadly to include, for example, ensuring that an operation—analytical or transactional—fully completes all of its operations on data without that data being altered by outside operations. A transaction can contain many stepwise operations that must be performed in series. For instance, a transaction to transfer money may obtain the current balance of the source account, check that the balance is sufficient to support the withdrawal, subtract the amount from the source account, and add the amount to the destination account, all before completing the entire transaction. It is useful that the source account not have another withdrawal occur after the first transaction checks the balance but before it completes, because otherwise the source account may accidentally be overdrawn. We use the phrase entire set of data broadly to include, for example, at least the data required to perform an analytical operation, potentially, but not necessarily, a proper subset of all data in the database. We use the term view broadly to include, for example, a consistent moment-in-time snapshot of all data in the database or a proper subset of all data in the database.

The need to mediate between the different latencies in transactional workloads and analytical workloads is especially important for online transaction processing systems, since they typically have an end-user expectation of sub-second response times for a transaction to be completed. For example, in an online financial trading system, it is important for trades to execute in under one second so that a trader can capture the value reflected by the trade, even though complex financial analysis operations may be simultaneously running on the trading system.

We describe here hybrid transactional/analytic processing systems, and implementations of them, that allow simultaneous transaction operations that can modify the data stored in the system and analytic operations that can access large subsets of the data stored in the system without degrading the low latency requirements of the transaction operations and while maintaining consistency of the data in the database. The system reduces contention for resources between the transactional and analytic operations such that transactions can be completed, for example, in less than one second even while complex analytics are running, and analytics operate over a consistent view of the data even while a transaction that changes the data is running This is accomplished, in some implementations, by one or more analytical operations creating snapshots of the locations of needed data. If an analytical operation is interrupted by a transactional operation, the transactional operation creates a new version as a copy of the data to be changed and appends the new version containing the changed data to a new location in storage—leaving the original version intact. When the analytical process resumes, it operates on the old version of the data at the locations pointed to by the snapshot. Therefore, when the analytical operation resumes, it can work on the data in its state as it was at the consistent moment in time.

The analytical process can be executed on data of the database that has been expressed according to a schema that is natively suited to online transaction processing. The analytical tasks are executed without requiring any transformation of the schema according to which the data is expressed. In addition, the schema of the database can express arbitrarily complex relationships between data within and between clusters, such as hierarchical object relationships with cardinality. In other words, the schema can conform to arbitrarily expressive semantic models. In our implementation, a Context model is used to describe the relationships between data within and between data clusters. A Context model is both an example of a model well suited to describe the complexity of a real-world business, as described in Executing Algorithms In Parallel, U.S. patent application Ser. No. 13/842,253, and a model well suited for analytics, as described in Structuring Data, U.S. patent application Ser. No. 13/841,730, both incorporated by reference here in their entirety.

Typically, data that is to be the subject of online transaction processing (OLTP) is expressed according to a schema that is natively suited to such processing. In some cases the data schema conforms to a model that is particularly useful for OLTP, such as a business object model or an entity-relationship (ER) model. Such models are examples of what might be called "highly-expressive semantic models"; they are models that can be of any arbitrarily high level of expressiveness. Conventionally, to perform analytical processes (for example, traditional business intelligence processes) on data that has been expressed according to such a model, it has been considered desirable to create a copy of the data according to a transformed schema, for example a "star-schema" or a "snowflake-schema". In some cases, the schema is denormalized, that is, copies of the data are intentionally created in order to permit advanced analytics on the data in an efficient way.

As shown in FIG. 1, in some implementations, the unified system 100, also referred to as the HTAP system, is a distributed data processing and storage system for data that can perform analytical and transactional functions, also known as operations. The HTAP system 100 includes any number of HTAP nodes 110 (two are shown) distributed across a network. In some implementations, the HTAP system 100 includes a single HTAP node 110. HTAP nodes 110 are networked computer nodes each running at least one instance of HTAP software. Each of the HTAP nodes 110 is used to receive and process requests for transactional or analytical operations, to submit requests for transactional or analytical operations, or both.

For example, an HTAP node 110 can be used to submit a request for transactional or analytical operations, but not to process the requests. For another example, an HTAP node 110 can be used to submit a request for transactional or analytical operations and can be used to process requests. We use the term distributed broadly to include, for example, logical or physical separation of resources or both. We use the term networked broadly to include, for example, logical or physical connections among nodes, or both, for example, connections over the internet, over a virtual private network, or over a local area network.

One or more HTAP slices 116 run on the HTAP nodes 110, an HTAP slice 116 having access to some portion, or slice, of its HTAP node's 110 resources. Each HTAP slice 116 has access to computation resources 118, persistent data storage resources 120, and transient data storage resources 122 on its HTAP node 110. Some subset of the resources 118, 120, 122 are allocated to each HTAP slice 116. An HTAP slice 116 has access to part or all of resources 118, 120, 122 on its HTAP node 110. In some implementations, an HTAP slice 116 is associated with an operating system level process.

We use the phrase computation resources broadly to include, for example, resources to support executing instructions for a general-purpose computer, for example memory or central processing units. We use the phrase transient data broadly to include, for example, data that is stored in such a way that it may not be available indefinitely or for any arbitrarily long period of time.

Figure 1A:
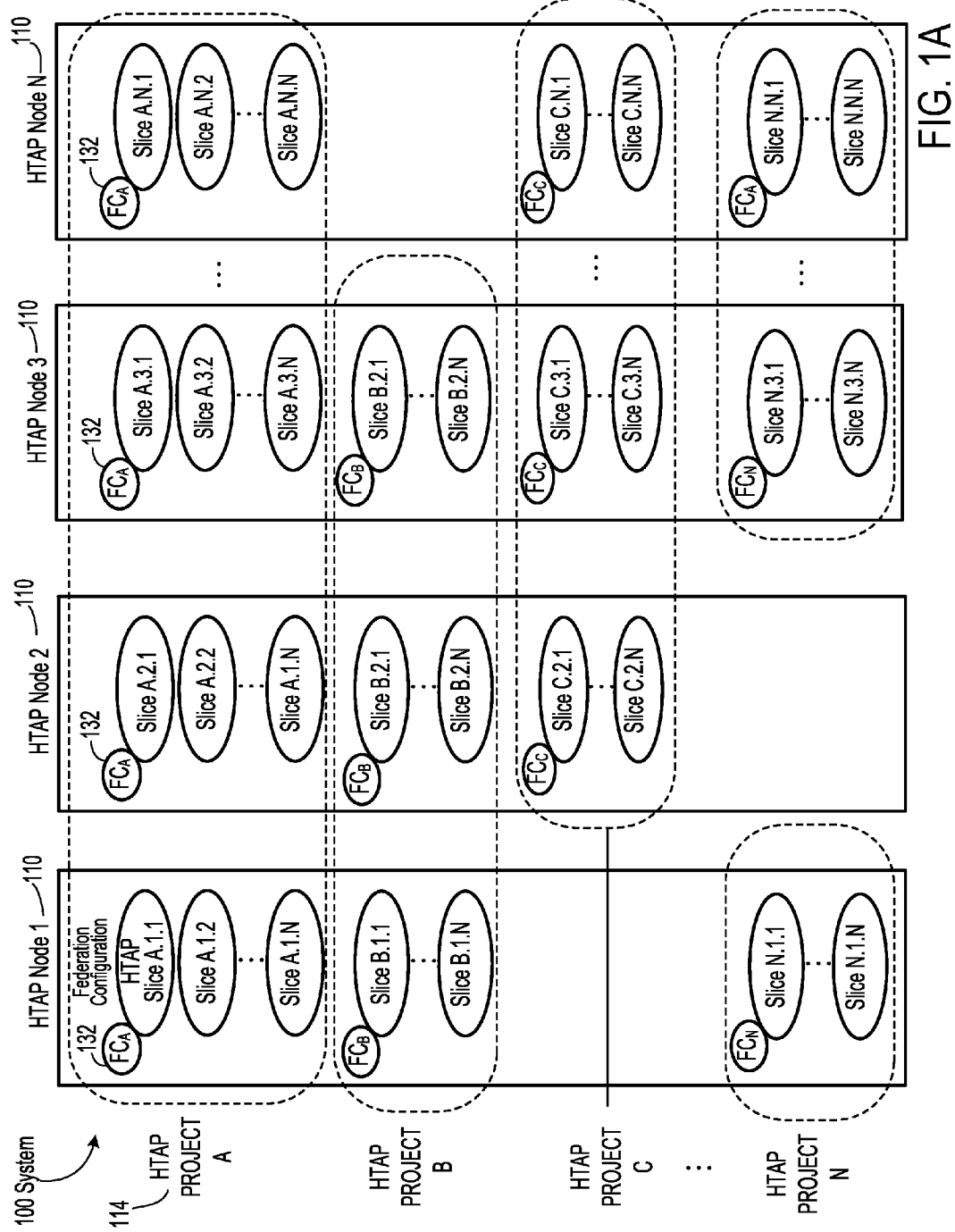

In some implementations, as shown in FIG. 1A, within the HTAP system 100 one or more so-called HTAP projects 114 (HTAP project can be thought of, in some respects, as a database abstraction that can be distributed across multiple machines, or as a way to specify a federated database and associated processing providing a logical separation of databases using the same physical hardware) each encapsulate one or more data processing operations, the data to be processed located in one or more storage resources allocated to HTAP slices 116, the operations to be run on one or more HTAP slices 116 on one or more HTAP nodes 110. In some implementations, an HTAP project 114 is created by a system administrator or database administrator when setting up a new database. We use the term and phrase encapsulate and logically encapsulate broadly to include, for example, independently grouping. For example, an HTAP project 114 is assigned HTAP slices 116 by a federation configuration 132 (federation configuration can be thought of, in some respects, as describing an HTAP project) identifying particular HTAP slices 116 on particular HTAP nodes 110, as described below in the HTAP Project section. In this way, each HTAP project 114 can be thought of as comprising a federated database and the mechanisms described by the federation configuration 132 for processing related to that database. Thus, an HTAP project 114 acts as an independent logical system, and can run on the same hardware, the same physical nodes and network, in parallel, as other HTAP projects 114 running on the same system 100. We use the phrase federated database broadly to include, for example, a database comprised of multiple databases.

In some implementations, as shown in FIG. 1A, the system 100 comprises multiple HTAP projects 114 (shown as Project A, Project B, Project C. Project N). Each HTAP project 114 is assigned one or more HTAP slices 116 on one or more HTAP nodes 110. For example, as shown for Project A on HTAP Node 1 is assigned Slice A.1.1, Slice A.1.2, . . . Slice A.1.N. A copy of the federation configuration 132 for each HTAP project 114 is located on each HTAP node 110 for that HTAP project 114. For example, federation configuration A for HTAP Project A is shown on Node 1, Node 2, Node 3, . . . Node N, the nodes containing the HTAP slices for HTAP Project A. In some implementations, the copies of the federation configuration 132 are stored in the storage resources on each HTAP node 110, for example, the persistent data storage resources 120, or transient data storage resources 122 on the HTAP node 110, as shown in FIG. 1. The storage resources used to store the federation configuration 132 can be the resources allocated to the HTAP slices 116 for the HTAP project 114, or can be other storage resources on the HTAP node 110. The federation configuration 132 is accessible by the HTAP slices 116 for the HTAP project 114, as described below in the HTAP Project section. Because an HTAP project 114 can span multiple HTAP nodes 110, multiple HTAP projects 114 can span independent groupings of HTAP nodes 110 in the system 100, which is useful for establishing multiple federated databases using the same or different HTAP nodes 110 in the system 100. For example, HTAP Project C does not use HTAP Node 1, but does use HTAP Nodes 2 through N.

In some implementations, the network communication mechanisms used by the HTAP slices for each HTAP project 114 are independent because the HTAP project's 114 federation configuration 132 specifies the communication mechanism to be used for each HTAP slice 116, as described below in the HTAP Slices section and accompanying figures. For example, each HTAP slice 116 uses a different subscription on a MIOsoft MIOplexer, a communications layer technology for routing and other services as described in U.S. patent application Ser. Nos. 13/838,518 and 13/353,381, which are incorporated by reference in their entirety. In some implementations using TCP/UDP communications, each HTAP slice 116 in each HTAP project 114 uses a different port number.

In some implementations, an HTAP project 114 is a logical encapsulation of data processing and storage resources allocated to HTAP slices 116 on some of the HTAP nodes 110. The HTAP project 114 represents a single database and related processing, whose operations are submitted to the HTAP project 114. An HTAP slice 116 runs on an HTAP node 110 and manages some portion of the HTAP project's 114 encapsulated operations. An HTAP project 114 refers to or points to some number of HTAP slices 116, with potentially two or more of the HTAP slices 116 running on a given node.

In some implementations, as shown in FIG. 1, data encapsulated in an HTAP project 114 are represented as objects 115 of types 117, and are separated into data segments known as clusters 124. We use the term object broadly to include, for example, a data structure with locations, sometimes called attributes, slots, keys, columns, cells, or members, the locations containing or referring to other data. We use the term type broadly to include, for example, a classification of data, for example integer, or customer. We use the term segment broadly to include, for example, portion or subset. A cluster 124 is a collection of data, for example, objects 115, that are read from and written to storage, for example, the persistent storage resources 120, or the transient storage resources 118, or both, as a single unit by the HTAP system 100. In this way, whenever a read or write is done from or to a cluster 124, all of the data, e.g., the objects 115, in the cluster 124, are written as a single unit or read as a single unit. For example, with respect to a single cluster 124 of objects 115 encapsulated (or referred to) by an HTAP project 114, the cluster 124 of objects 115 is stored in the persistent data storage resources 120, transient data storage resources 122, or both, allocated to a particular HTAP slice 116 on an HTAP node 110. Each HTAP slice 116 is responsible for some percentage of clusters 124 for an overall HTAP project 114. In some implementations, HTAP projects 114 contain a different organization of data, e.g., different object models, or different data structures.

Furthermore, besides storing objects and values of various types in the data structures within a cluster, one may also store references to data found only in another cluster, either on the same HTAP slice 116 as the referring cluster, or some other HTAP slice 116 of the same HTAP project 114. A reference may identify the specific cluster 114 where the referred object resides, as well as providing information about identifying the referred object within that cluster 114. One way to identify a referenced object within a cluster is by a number that is unique for each object within that cluster. These numbers correspond with their objects in a persistent way, such that when a new version of the cluster 122 is written to persistent storage 120, an object that is supposed to represent a new version of some old object, possibly with modifications, should have the same identifier in the new cluster version as the old object had in the old cluster version.

Another way that a data structure in one cluster, call it the origin cluster, can identify a referenced object within another cluster, call it the target cluster, is by maintaining a monotonic counter within the origin cluster and ensuring that when a message is sent from the origin cluster to the target cluster to create or otherwise initially determine the identity of an object in the target cluster, the message should contain a unique number allocated from the origin cluster's counter, which is then stored along with the origin cluster identifier in some way in the referred object. When attempting to find which object in the target cluster is being referred to, the candidate objects in the target cluster are examined to determine which has been labeled in this way with the reference's origin cluster identifier and origin cluster unique number. To clarify: While processing a request at the origin cluster, its counter is incremented to produce some integer N to be used for identifying some object in the target cluster. The triple consisting of the target cluster identifier, the origin cluster identifier, and N, is sent in a request to the HTAP Slice containing the target cluster. When the request is processed, the newly created or located object will be tagged in some way with this triple, presumably in an attribute reserved for that purpose. When a subsequent request attempts to find the same object using this triple as a reference, the target cluster identifier is used to locate the target cluster, and the objects in the target cluster are then examined to determine which one has the specified triple in that reserved attribute.

An alternative design avoids having to provide the origin cluster identifier in the reference triple by instead allocating from a global counter specific to the HTAP slice containing the origin cluster. To ensure this counter does not produce any values that would also be produced by other HTAP slices, either a global coordination scheme may be employed (in which communication between HTAP slices allocates blocks of identifiers globally unique to the entire HTAP project), or the counters increment by the number of HTAP slices, each HTAP slice's counter starting with a unique number modulo the number of HTAP slices.

Other mechanisms for implementing references may involve specifying or selecting from a collection of data structures and associated algorithms capable of locating an object within the HTAP project 114, even if the target object has moved to another cluster 124 on another HTAP slice 116, for example, as described in Maintaining A Relationship Between Two Different Items Of Data, Barabas, et al., U.S. Pat. No. 7,587,428, which is incorporated by reference in its entirety. More information about how one might implement references can be found in U.S. application Ser. No. 09/687,268, filed on Oct. 13, 2000 (Abandoned); U.S. application Ser. No. 10/385,758, filed on Mar. 11, 2003 (now U.S. Pat. No. 7,587,428); and U.S. application Ser. No. 12/535,834, filed on Aug. 5, 2009, which are incorporated here by reference in their entirety.

In some implementations, as further described below in the Cluster and Cluster Spaces section and accompanying figures, an HTAP project 114 is divided into cluster spaces that are assigned to respective HTAP slices 116, such that a cluster 124 can be assigned to a cluster space, thus assigning an HTAP slice 116 to any processing involving the data, e.g., objects 115, in that cluster 124. In this way, an HTAP slice 116 is like a process control element of the overall HTAP project 114 that operates with respect to some identified portion of the data. We use the phrase responsible for broadly to include, for example, being an accessor, or modifier, or both, of the data in the cluster. For example, in some implementations, any process in the system that wishes to read, write, or both, any of the data in that cluster can submit a request to that cluster's slice, and cannot otherwise access the data directly. In some implementations, an HTAP slice 116 is the sole accessor, or modifier, or both of the data in the cluster 124.

Figure 2:
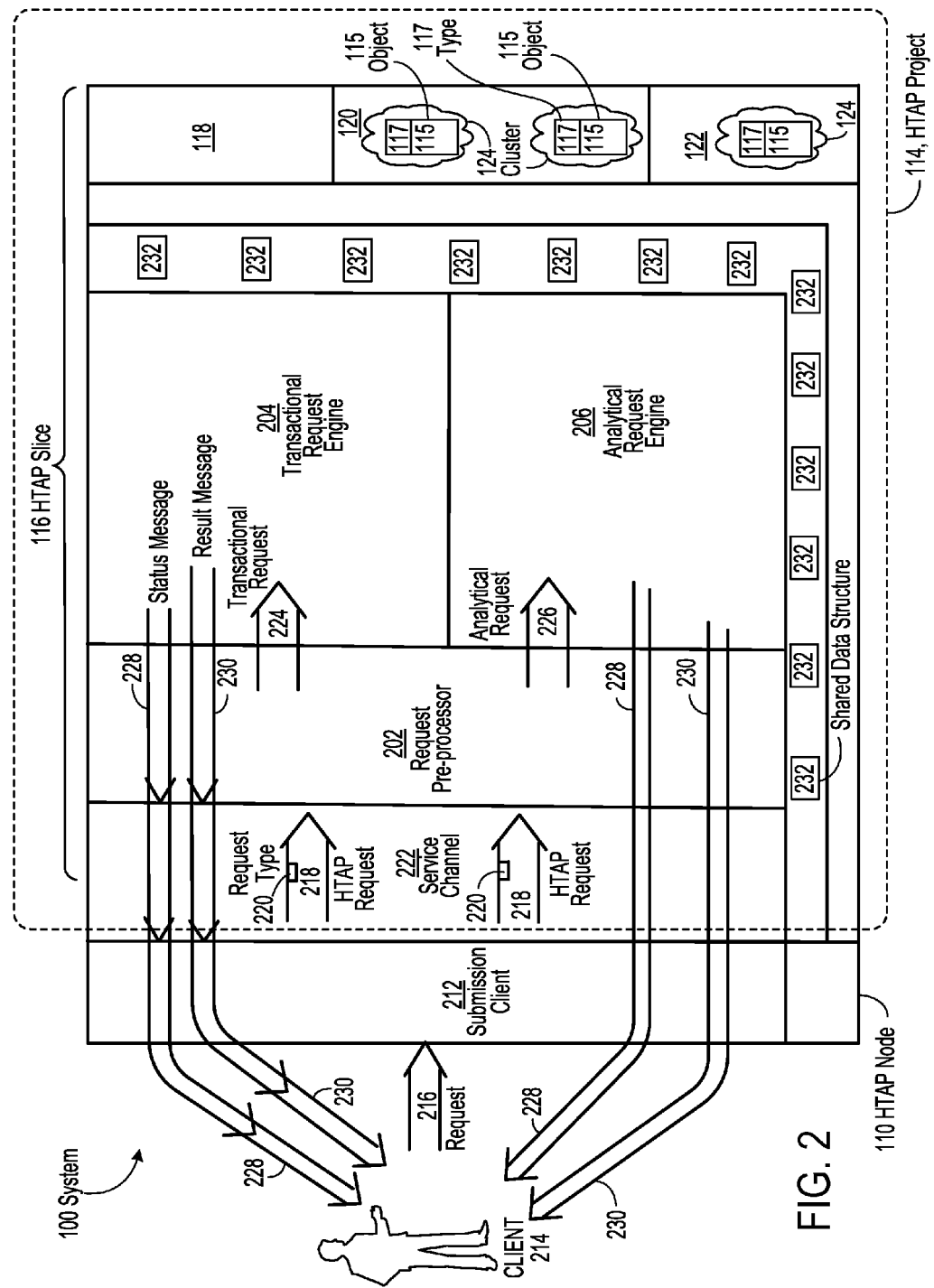

As shown in FIG. 2, in some implementations, each HTAP slice 116 has a request preprocessor 202 and at least two request engines, a transactional request engine 204 and an analytical request engine 206. The engines 204, 206 can service respectively transactional requests and analytical requests 224, 226 that may, in part, leverage the subset of data, for example, the clusters 124 that the HTAP slice 116 is responsible for. We use the term leverage broadly to include, for example, refer to for the purpose of performing the analytical or transactional functions.

The transactional request engine 204 executes high priority, low latency transaction requests 224, sometimes called transactional requests, that modify or create specific data, for example, data objects 115, in specific clusters 124 in the system 100. The analytical request engine 206 executes analytical requests 226 that can result in the return of data from a large number of clusters 124 in the system 100. The analytical request engine 206 can also execute analytical requests 226 that can perform computation upon or aggregation of data. Other kinds of computation may be performed by the analytical request engine 206, including but not limited to communicating with other HTAP slices 116, either to utilize the available computation resources 118 and transient storage resources 122 of the other slices, or to request information to be retrieved or otherwise processed from within clusters that reside on other slices.

A submission client 212 runs on a client request submission-capable HTAP node 110 (not all HTAP nodes are capable of handling client request submissions) and accepts requests 216 from one or more clients 214 of the system. The submission-capable HTAP node 110 need not be part of the HTAP project 114 (e.g., not on an HTAP node 110 on which HTAP slices 116 are run), but need only be in the communication mesh. We use the term mesh broadly to include, for example, a mesh as described in U.S. patent application Ser. Nos. 13/838,518 and 13/353,381, both referenced earlier. We sometimes refer to the clients as users, such as an end user who may submit client requests through a web interface or another electronic system. As further described below in the Submission Client section and accompanying figures, a submission request is a request from a user for the unified system to perform transactional or analytical operations, with both types of operations possibly returning data values. In some implementations, the submission request need only be directed to the system 100 and does not need to be aware of where the relevant data is stored or which slice will perform the request. For example, "subtract 100 from the balance of account 2024" or "compute the sum of all accounts." The submission client 212 processes a client's 214 requests 216, for example, by first applying security checks to make sure the requesting client is allowed to perform the requested function or functions, and then by creating and submitting corresponding HTAP requests 218 for the HTAP project 114. A client's 214 requests 216 for the HTAP project 114 (the HTAP project 114 being a way of describing slices 116 working together as a single logical system) to perform some operational or analytical task are submitted by the submission client 212 in the form of HTAP requests 218, each having an HTAP request type 220, the types 220 being explained below in the HTAP Requests section. In some implementations, the submission-capable HTAP node 110 is not encapsulated by the HTAP project 114, (for example, is not an HTAP node that runs HTAP slices 116) but rather, the HTAP node 110 communicates with other HTAP nodes 110 that are encapsulated by the HTAP project 114, the other HTAP nodes 110 running slices 116. We use the term client broadly to include, for example, a consumer of a resource, for example, a user or another process.

An HTAP slice's 116 request preprocessor 202 accepts these HTAP requests 218 using a service channel 222. The request preprocessor 202 submits the HTAP requests to the appropriate request engines 204, 206, as further explained below. The request engines 204, 206 communicate with the HTAP slice's 116 allocated computational resources 118, transient data storage resources 122, and persistent data storage resources 120 to fulfill the HTAP requests 218. A description of request engines 204, 206 communicating with other HTAP slices 116 is described below in the Submission Client section and accompanying figures. Transactional requests 224 are submitted to the transactional request engine 204, and analytical requests 226 are submitted to the analytical request engine 206. In turn, the request engines 204, 206 send status messages 228 and result messages 230 to the request preprocessor 202, which in turn, sends the messages 228, 230 using the service channel 222 to the submission client 212, and the submission client 212 sends the messages 228, 230 to the client 214.

A separate submission client 212 is established for each connection with an HTAP Slice 116 of the HTAP project 114 to which the client needs to communicate.

As shown in FIG. 3a, in some implementations, when an analytical request engine, for example, the analytical request engine 206 shown in FIG. 2, processes an analytical request 302, for example, the analytical request 226 shown in FIG. 2, the analytical request engine first creates a list 304 of all the locations in transient storage, persistent storage, or both containing the clusters that contain the data the analytical request engine needs to perform the request 226. The analytical request engine the stores the list of locations 306. Then, the analytical request engine retrieves the data 308, for example, by requesting the data at the given locations from the data storage subsystem (e.g. by performing an Operating System API call), and processes the data in some way 310. The order in which the data is retrieved can be arbitrary. In some implementations, if the locations of clusters containing the needed data correspond to physical locations, it can be useful to perform reads of the data in physical order (e.g., to reduce seeks on a spinning hard disk). This can be accomplished by sorting the locations just prior to storing them 306. As shown in FIG. 3b, in some implementations, when a transactional request engine, for example, the transactional request engine 204 shown in FIG. 2, processes a transactional request, for example, the transactional request 224 shown in FIG. 2, that performs an update to the data 312, the updated data 314 is written as a new version, sometimes called appending, to storage, for example, the persistent storage 120 as shown in FIG. 2, and the original data remains unmodified for the moment in the cluster, as further described below in the Transactional Request Engine section and accompanying figures.

Returning to FIG. 2, during the execution of requests 224, 226 (as shown in the flowcharts in FIGS. 3a and 3b), if there is contention for one or more of the HTAP slice's 116 allocated resources 118, 120, 122 between the transactional 204 and analytical 206 engines, the transactional request engine 204 takes precedence. For example, if the transactional 204 and analytical 206 engines both need to execute operations to service requests that access the same data contained in the persistent storage resource 120, then the transactional request engine uses the resource first and the analytical request engine waits to use the resource until the transactional request engine's operations have completed. In this case, it is likely that the analytical request engine 206 will have been interrupted while performing a request 226. When access to the HTAP slice's allocated resources 118, 120, 122 is returned to the analytical request engine 206, it can continue to perform that request 226 as if no interruption took place because of the writing of updated data as a new version as described above. The analytical request engine 206 will continue to perform the request 226 on the version of the data still stored in the cluster that existed at the point in time of the initial creation of the list of data locations needed to fulfill the request 226. The control flow is further described below in the Prioritization and Control Flow section and accompanying figures.

For example, as shown in FIG. 3c, in some implementations, an analytical request engine 206 on an HTAP slice 116 makes an analytical request 226a. The analytical request 226a will operate on data ($100) in an object 115, objectv0, in a cluster 124, clusterv0, in persistent storage 120. The analytical request engine 206 gets a pointer to the location of clusterv0 (for example, by accessing a cluster analytical reference store described in the Request Preprocessor section below) and stores the pointer. A transactional request engine 204 running on the slice 116 makes a transactional request 224a that interrupts the analytical request 226a. The transactional request 224a will initially be directed at the data ($100) in objectv0 in clusterv0. As shown in FIG. 3d, instead of modifying the data in objectv0, the transactional request engine 204 copies clusterv0 to a new version, clusterv1, which includes objectv1, a new copy of objectv0. Clusterv1 is created in persistent storage 120 at a different location than clsuterv0. The transactional request 224a operates on objectv1 in clusterv1, changing the data to $200. Objectv0 remains in the same state it was in before transactional request 224a interrupted analytical request 226a. When analytical request 226a resumes, it continues to operate on objectv0 in clusterv0, and objectv0 still contains the old data $100. Because references within the system 100 (e.g., the cluster analytical reference stores) point to the new cluster version, clusterv1, and not the old cluster version, clusterv0, subsequent analytical requests 226b and transactional requests 224b will operate on clusetrv1 and not clusterv0.

HTAP Nodes

In some implementations, an HTAP node 110 may be a physical node, that is a node in which a single operating system runs directly on the node's computer hardware. In some implementations, an HTAP node 110 may be a virtual node, that is, a node in which one or multiple operating systems run simultaneously on software, sometimes known as hypervisor software, that is installed on the node's computer hardware. Such software is commercially available, and examples include VMware ESXi and Microsoft Hyper-V.

It is helpful for the nodes 110 to communicate with each other using standard networking protocols, such as TCP or UDP, and for each node 110 to be reachable, in a network sense, from any other node 110 in the distributed system. A node can be directly reachable by its IP address or through another IP address using network address translation (NAT). Most major operating systems include the TCP/IP and UDP/IP communications layers to enable networking for the HTAP system 100. In some implementations, a node 110 may be indirectly reachable through a routing layer, in which case it is helpful for each node 110 to be directly reachable by at least one other node 110. In some implementations, at least for efficiency and to overcome socket limitations for large installations, HTAP systems 100 use the MIOsoft MIOplexer communications layer technology for routing and other services, as described in U.S. patent application Ser. Nos. 13/838,518 and 13/353,381, both referenced earlier.

Because all the nodes 110 are connected either directly or indirectly, in some implementations, every node 110 in the system can be both a request processing-capable node and a client request submission-capable node.

Figure 4:
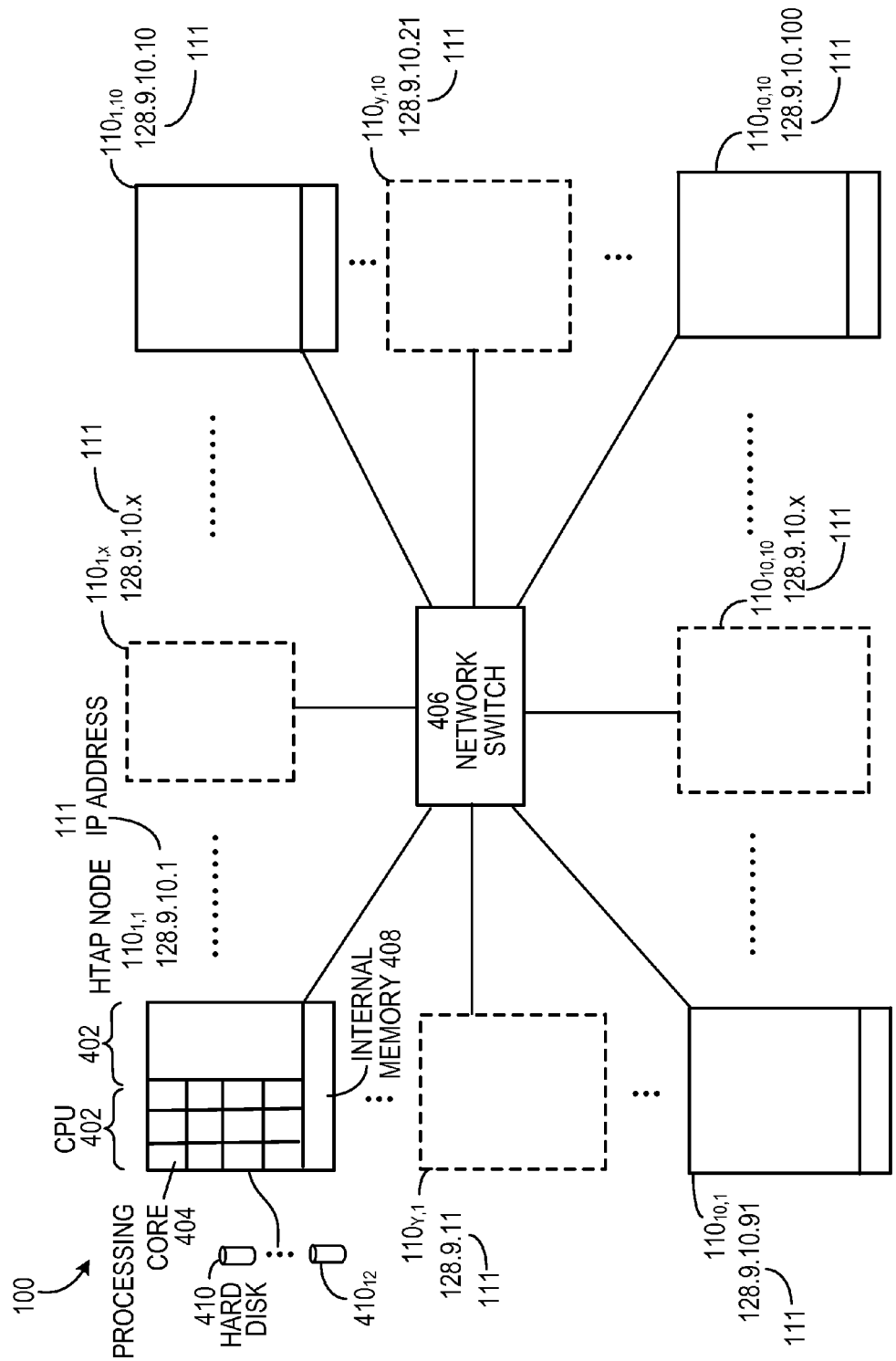

As shown in FIG. 4, in some examples, the unified system 100 could contain one hundred HTAP nodes 110, each being an x86-compatible server with two primary processors (CPUs) 402, each processor having twelve processing cores 404, running the Microsoft Windows Server 2008 R2 operating system. Each node 110 has an IP address 111 with matching subnets, such that each node 110 is directly reachable from each other node 110 through a local Ethernet network switch 406, each node 110 running TCP and UDP protocols over IP, and each node 110 running the MIOsoft MIOplexer communications software.

HTAP Project

Returning to FIG. 1, in some implementations, an HTAP project 114 encapsulates a collection of some number of HTAP slices 116 that distribute the processing needed to serve requests and manage data persistence of the data associated with the slices. Each slice 116 is assigned to a node 110, and there are potentially multiple slices 116 on some nodes 110. Each HTAP slice 116 is allocated and has access to computation resources 118, persistent data storage resources 120, and transient data storage resources 122.

Because the HTAP system services both transactional and analytical processing requests that, in part, take advantage of persistent data, it is useful for an HTAP project 114 to store and retrieve data efficiently. For this purpose, some implementations use a number of data persistence techniques described in Persistent Data Storage Techniques, Barabas et al., U.S. Pat. No. 7,689,560, which is incorporated by reference in its entirety. More information about how one might use data persistence techniques in this way can be found in U.S. application Ser. No. 09/687,941, filed on Oct. 13, 2000 (Abandoned); U.S. application Ser. No. 10/821, 586, filed on Apr. 9, 2004 (now U.S. Pat. No. 7,689,560); U.S. application Ser. No. 12/711,402, filed on Feb. 24, 2010 (now U.S. Pat. No. 8,489,567); and U.S. application Ser. No. 13/828,209, filed on Mar. 14, 2013, which are incorporated here by reference in their entirety.

In an HTAP project 114, it is useful for the set of all data in the project 114 to be organized into more fine grained units that have unit types, to allow more efficient processing of the data and to provide a way to distribute the data across the slices 116 and nodes 110. In some implementations, as described further below, each piece of data is represented as an object with attributes, and certain objects have an identity, meaning the type of the object is known to the system. The type is useable by the system to distinguish some objects from other objects, which is sometimes called classifying objects. There are several techniques for describing such an object model. In the implementation described below, we use an object model described in Executing Algorithms In Parallel, U.S. patent application Ser. No. 13/842,253, which is incorporated by reference in its entirety.

In some implementations, for example implementations that do not use objects where the data has an undefined type, a type is defined by using a data structure, sometimes called a KeyValue. The KeyValue contains a tuple. In some implementations, the first element of the tuple is a key, and the second element of the tuple is the value, which is some chunk, also known as a unit, of data that has an undefined type. For example, a KeyValue could be a tuple <customerNumberAsKey, customerNameAsValue> such as <35601, "Jordan Barrette">. In some implementations using KeyValues, every piece of data is associated with a key. Using KeyValues allows the system 100 to store, update, and retrieve data using the keys, without necessarily knowing the data's structure. For example, the cluster analytical reference store as described would contain references to all of the current KeyValues in the system 100, the latest version based on the key. Analytical operations would run over the entirety of the data store. In some implementations using objects with types, analytical operations run over a subset of the data store by iterating over the current versions of objects of a certain type, which is useful in saving time. The analytical operations can include some way of interpreting the untyped data as part of the analytical computation In some implementations, as shown in FIG. 1, each HTAP project 114 has a federation configuration 132. The federation configuration 132 contains a list of HTAP slices 116 for a particular project 114, and details describing each slice 116, including a slice ID 126. The federation configuration 132 is accessible from each HTAP node 110, for example, as a local copy of the federation configuration 132 as shown, or, remotely over the network. Details of the federation configuration 132 are further described below in the HTAP Slices section, and FIGS. 7 and 7a.

Figure 5:
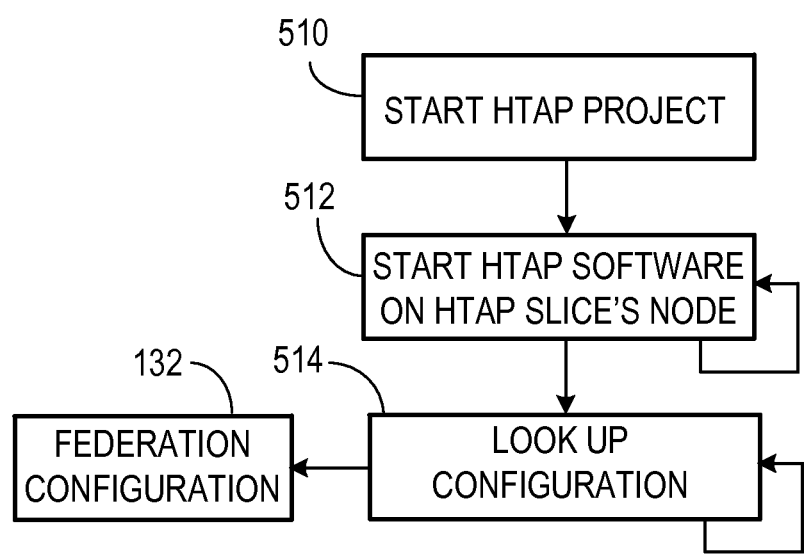

As shown in FIG. 5, in some implementations, after starting 510 an HTAP project, a copy of the HTAP software is started 512 for each HTAP slice, on that slice's respective node. When started, each slice receives its slice ID from a standard configuration file local to the slice process, or from a command line parameter. The slice then uses the slice ID to look up 514 its configuration in the federation configuration 132 for the HTAP project, for example the HTAP project 114 as shown in FIG. 1.

Clusters and Cluster Spaces

Returning to FIG. 1, in some implementations, each chunk of data encapsulated by the HTAP project 114 is assigned to some data cluster 124. A cluster 124 is defined as data read from and written to persistent storage, or transient storage, or both, for example, the persistent storage resource 120, as a single unit by the HTAP system 100.

In some implementations, as further described below, a cluster 124 contains a number of objects 115. In some implementations using objects, a cluster is synonymous with a container, as defined in the Persistent Data Storage Techniques patent referenced earlier. In some implementations, a cluster 124 contains some number of key-value pairs.

In some implementations, locks on data during the execution of transactions can be used to maintain data consistency. In some implementations that use clusters 124 of objects 115, locks can be maintained on a per-cluster basis, rather than on units of data inside the clusters, which is helpful in reducing latency by reducing the amount of locks that need to be acquired during a transaction and reducing the overhead in maintaining the locks, as described in the Persistent Data Storage Techniques patent. Objects 115 within a cluster 124 may contain references to objects 115 in some number of other clusters 124.

In some implementations, when the system 100 performs a transaction that affects multiple clusters 124, which can happen in general (e.g., an update of multiple objects 115 that are assigned to different clusters 124) or can happen because of the references (e.g., deleting an object 115 that is referenced by another object 115 in a different cluster 124) then the clusters 124 involved in that transaction need to be locked. This is because a transaction potentially has multiple operations that must happen in series and must all complete for the transaction to succeed. In some implementations, as described below in the Request Preprocessor section and accompanying figures, locks are established on pointers or references to clusters 124, for example, a cluster analytical reference store, and the clusters 124 themselves are not locked. We use the term lock broadly to include, for example, techniques to manage access to data such that data consistency is maintained in a multi-user system.

In some implementations, each cluster 124 is assigned to a cluster space 128. A cluster space 128 contains predefined, assignable locations 130 for clusters 124. Each cluster space 128 can contain multiple clusters 124. There can be multiple cluster spaces 128 on an HTAP slice 116.

For example, in some implementations, a cluster space 128 is analogous to a bucket in a hash table, a data structure typically used for efficient access of data. In some implementations, cluster spaces 128 are synonymous with contention spaces as defined in the Persistent Data Storage Techniques patent.

When a new cluster 124 is created, for example when a transactional request creates a new version as described above, in the system 100, that cluster 124 is assigned to a cluster space 128. There are many possible techniques to assign clusters 124 to cluster spaces 128, while keeping the distribution sufficiently balanced, which is useful for efficiency. In some implementations, if the cluster spaces 128 are thought of as hash table buckets, then a hash function could be used to assign a cluster 124 to a cluster space 128. Some implementations use the techniques described for assigning containers to contention spaces as described in the Persistent Data Storage Techniques patent. In some implementations, a new cluster 124 is created in response to a client 214 submitting a transactional request to create new data. For example, a request to create a new customer record, or a request to perform an initial batch load of the HTAP system 100 from existing data, which is useful in migrating data from another system to the HTAP system 100.

Each cluster space 128 is assigned to an HTAP slice 116. In this way, cluster spaces 128 provide a mapping such that each cluster 124 is associated with some HTAP slice 116. The federation configuration 132 contains the full range of cluster spaces 128 for the HTAP project 114, as a collection of cluster space subranges, each assigned to a single HTAP slice 116. Specifying cluster space subranges is further described below in the HTAP Slices section, and FIG. 7a.

HTAP Slices

As shown in FIG. 1, in some implementations, each HTAP slice 116 is a single process (e.g., an operating system process) that is responsible for some portion of the data in an HTAP project 114, by being assigned some number of cluster spaces 128 in the project 114. In this way, only a single HTAP slice 116 is allowed to operate on (e.g., create, read, update) the clusters 124 mapped to those cluster spaces 128. Because each slice 116 has access to its slice ID 126, each slice 116 knows the cluster spaces 128 for which each slice 116 is responsible, and can access the range of cluster spaces 128 assigned to its slice ID 126 in the federation configuration 132, as described further below. In other words, each HTAP slice 116 has access to the mappings of cluster spaces 128 to HTAP slice 116.

In some implementations, a slice 116 may have access to specialized hardware or software subsystems to help it perform certain functions. For example, persistent storage 120 may take place and be located on a specialized external storage device, and computational resources 118 may take advantage of computational coprocessors to extend the capabilities of the node's 110 primary processors. The federation configuration 132 also contains a local or remote path identifying where persistent data should be stored, as further described below. Examples of commercially available external storage devices include network attached storage (including storage area networks) and external direct attached storage.

For example, returning to FIG. 4, in some implementations, each of the one hundred nodes 110 contains 256GB of internal memory 408 and twelve directly attached hard disks 410 each with 4TB of capacity. In this case, the most common scenario is for a slice, for example, each of the slices 116 shown in FIG. 1, to use the directly attached hard disks 410 for persistent data storage (for example, the persistent data storage 120 shown in FIG. 1), the internal memory 408 for transient data storage (for example, the transient data storage 122 shown in FIG. 1), and the primary processors 404 for computation (for example, the computational resource 118 shown in FIG. 1).

Figure 6:
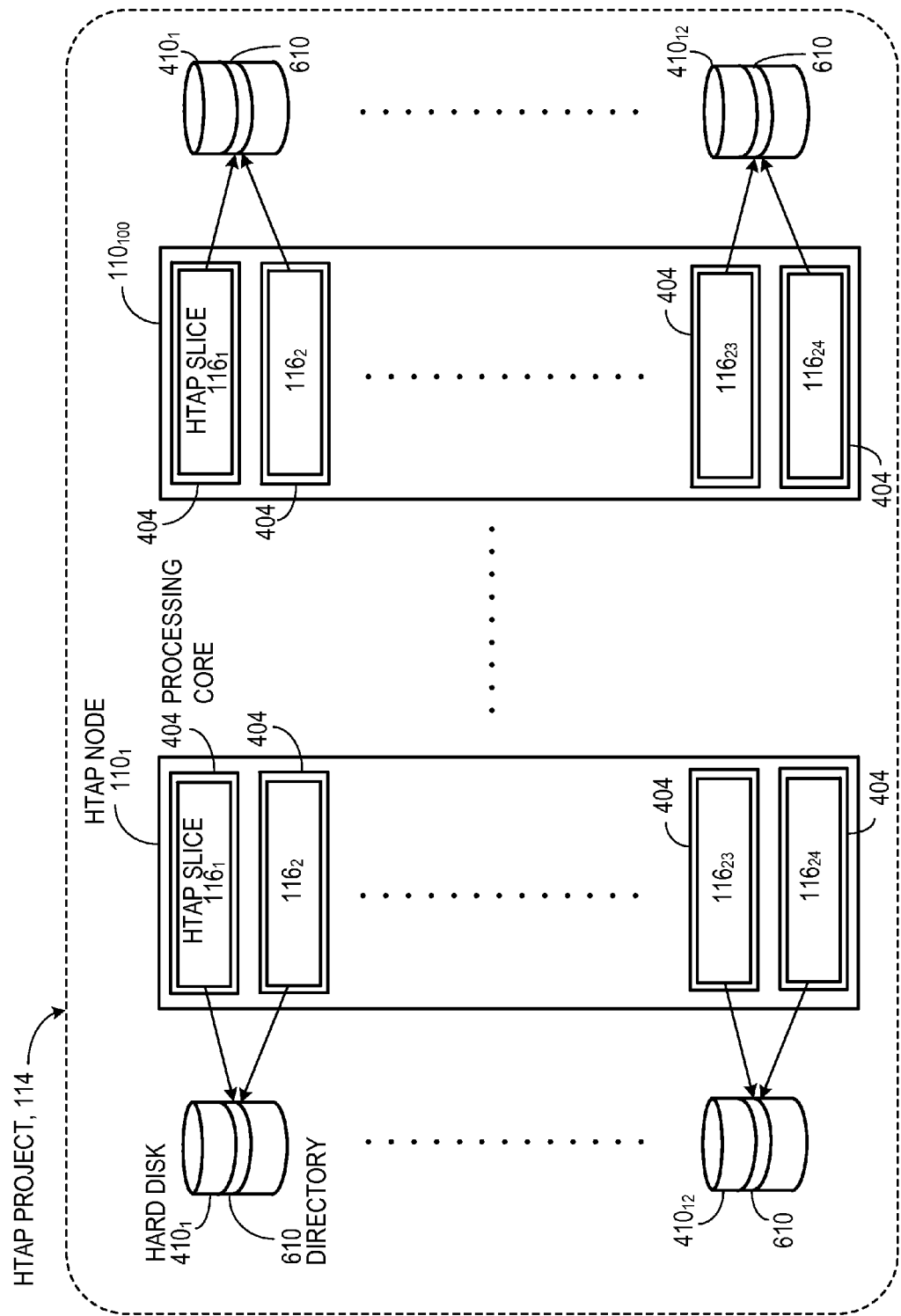

For example, as shown in FIG. 6, in some implementations, an HTAP project 114 contains at least one slice 116 for each of the twenty-four processing cores 404 in each node 110. The slices 116 are evenly assigned to the twelve hard disks 410 for the respective node 110, two slices 116 per hard disk 410.

Figure 7:
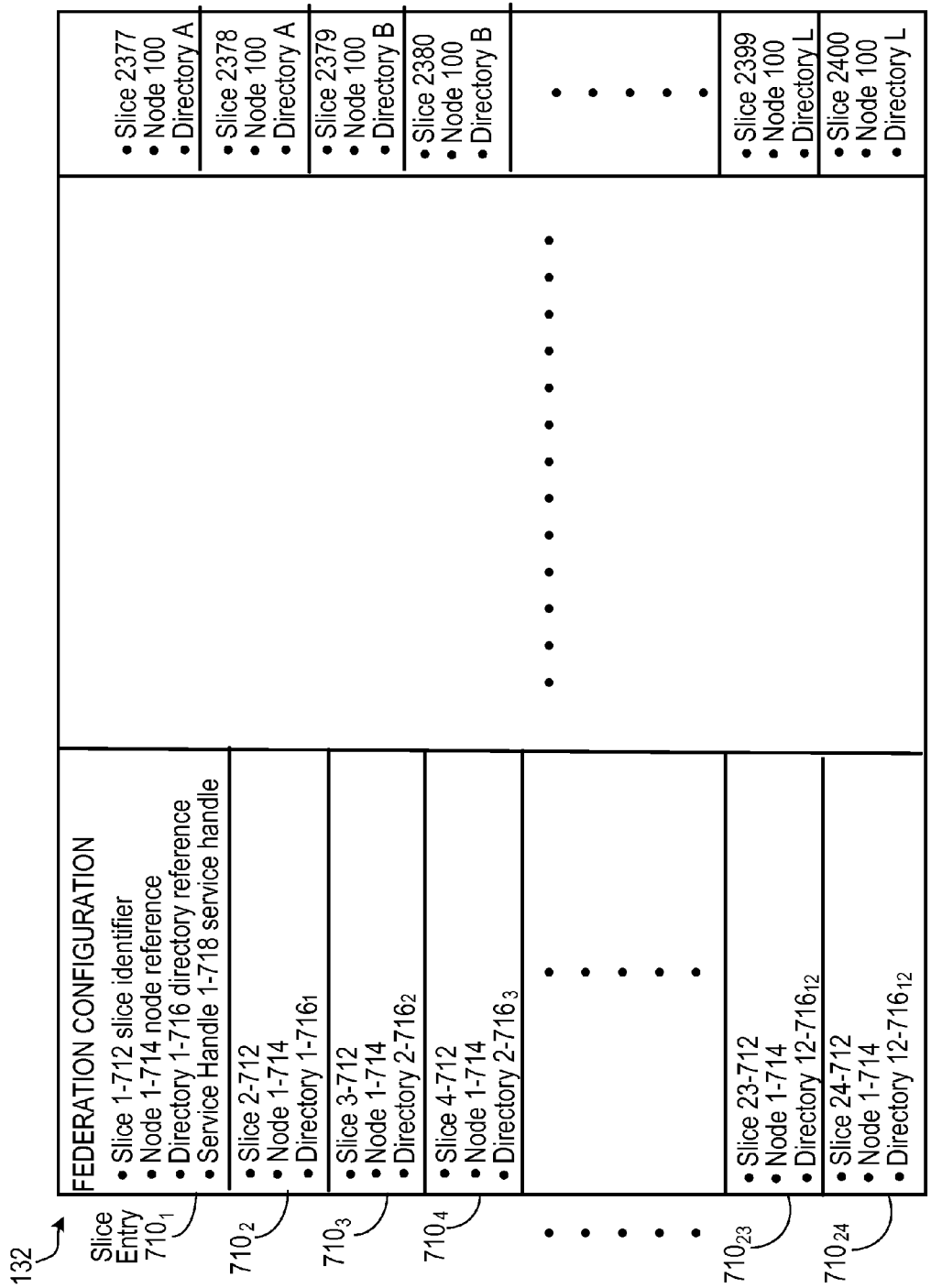

As shown in FIG. 7, in some implementations, the federation configuration 132 for the project 114 shown in FIG. 6 would include, for each node 110 as shown in FIG. 6, a slice entry 710 for each of twenty-four slices (for example, the slices 116 as shown in FIG. 6), each slice entry 710 containing a slice identifier 712 and a node reference 714 (for example, a reference to one of the one hundred nodes 110 shown in FIG. 6). Additionally, two slice entries 710 for each node 110 contain a directory reference 716 that references a directory (for example, the directory 610 shown in FIG. 6 on each local disk 410 shown in FIG. 6) for persistent data storage.

As shown in FIG. 7a, in some implementations, a federation configuration, for example, the federation configuration 132 as shown in FIG. 7, can be described in a federation configuration structured format 719 using, for example, extensible markup language (XML), or the like. XML is described, for example, at http://www.w3.org/XML/ incorporated here by reference. Describing a federation configuration in this way is useful for portability, conformance to standards, and management by a variety of tools, such as an XML editor. A federation 720 contains an HTAP project name 722, for example, naming an HTAP project 114 as shown in FIG. 1, and slice specifications 724. Within the slice specification 724 are slice details 726, for example the slice entries 710 as shown in FIG. 7.

The slice details 726 for a given slice contain: a slice identifier 728, for example, the slice identifier 712 as shown in FIG. 7; a node name 730, for example, the node reference 714 as shown in FIG. 7; a client service handle structure 732, for example, the service handle 718 as shown in FIG. 7 and described further below; a beginning cluster space 734; an ending cluster space 736; and a persistent storage path 738, for example, the directory reference 716 as shown in FIG. 7. The beginning cluster space 734 and ending cluster space 736 are used to indicate the beginning and end of a cluster subrange, as described above, that identify where within the persistent storage path 738 a slice's 726 data is located. In some implementations, each HTAP slice 116 creates a directory within its allocated persistent data storage resources 120, or transient data storage resources 122, or both, the directory name containing the HTAP slice's 116 slice identifier 728. The slice 116 writes clusters 124 in the identified directory.

In some implementations, the clusters 124 are written in disk-physical order (i.e., the order of clusters on disk is the chronological order that they were written). In some implementations, in which a file is used for persistent storage, the size of the file will be increased when writing clusters 124.

In some implementations, the file is grown by more than the space needed to persist an update or new cluster. Determining the amount to grow the file is based on decreasing data seek time, such that the data seek time is a relatively small percentage, e.g., less than 10%, of the overall time required to retrieve data. The time required to retrieve data is based on the data seek time and the time needed to transfer and read or write the actual data. In some implementations the amount of space in the file that is allocated by the system 100, but not currently being used to store data, is kept at a relatively small percentage, e.g. less than 10%, of the overall file size. In some implementations, the allocated, but unused space is unable to be used by other slices or processes sharing the same disk. In some implementations, the sizing of the file includes using heuristics based on some, none, or all of: trial and error; real world usage; the features and configuration of the database such as maximum, minimum, or average data object or cluster size; or the features and configuration of the infrastructure, such as the operating system, file system type used by the storage medium, and that storage medium's block size. Growing the size of the file is useful in decreasing fragmentation, which can occur when increasing the size of the file on a per-update basis such that the file occupies many locations on a spinning disk. Fragmentation can lead to increased time in reading and writing data from and to a spinning disk because of the relatively large overhead, e.g. typically about 5 milliseconds, in seeking a new location on the disk. Growing the size of the file is useful in an append-only system to support the hybrid transactional analytical system 100, as further described below.

In some implementations, in which a file is used for persistent storage, a new file is at times created by the system 100 when writing clusters 124. Having multiple files is useful in cleaning up the database so that storage is used more efficiently. For example, by freeing the storage allocated for old versions of clusters 124 because files that contain only old versions of clusters 124 can be deleted if no analytical operations that reference the old versions of clusters 124 are being performed. As another example, files containing many old versions of clusters 124 can be deleted if the current versions of clusters 124 in the file are first moved to a new file, thus decreasing the amount of data movement required. This is useful in overcoming file size limits present in some file systems and operating systems, for example, a FAT 32 file system that supports a maximum file size of approximately four gigabytes. Having multiple files in this way is useful in an append-only system to support the hybrid transactional analytical system 100, as further described below. In some implementations, for example, ones in which no maximum file size exists, using multiple files in this way is not required.

In some implementations, the system maintains an index mapping from pairs comprising cluster space 128 and cluster identifier to physical disk locations within a database file. In some implementations, the slice details 726 can be used to map to locations within a single file in which the clusters are stored. In some implementations, the slice details 726 can be used to map to locations in memory in which clusters are stored.

In some implementations, the client service handle 732 contains a MIOplexer name 740, a TCP port 742, and a service handle identifier 744. Describing the client service handle 732 in this way is useful for leveraging the MIOsoft communications layer technology for routing and other services, as described above and below.

In some implementations, other data formats can be used to describe a federation configuration, including structured and unstructured data formats.

Returning to FIG. 2, in some implementations, each slice 116 contains subsystems for processing transactional and analytical requests, performing maintenance (e.g., persistent and non-persistent storage garbage collection, and other optimizations), and retrieving persistent data from the slice's 116 assigned cluster spaces (for example, the cluster spaces 128 shown in FIG. 1). These subsystems include a request preprocessor 202, request engines 204, 206, a service channel 222 connected between a submission client 212 and the request preprocessor 202, and shared data structures 232. In some implementations, these subsystems 202, 204, 206, 222, 212, 232 may each be running as one or more threads of one slice process, from the perspective of the node's 110 operating system. Concurrency control, for when threads are running in parallel, for these threads to access the shared data structures 232 can use standard techniques such as semaphores, mutexes, and monitors. We use the term thread broadly to include, for example, an execution context running on a computational resource. We use the phrase concurrency control broadly to include, for example, a method for ensuring data consistency in the presence of potentially multiple simultaneous data accesses, which typically occurs in a computational environment containing multiple threads, as well as methods that avoid or minimize by design the need to use mechanisms such as semaphores, mutexes, and monitors. We use the phrase slice process broadly to include, for example, a computer program that performs some or all of what the slice is capable of performing. In this way, in some implementations, threads can be components of the computer program that can run to perform various jobs that the slice process is capable of performing. In some implementations, threads can be executed in parallel based on the features of the node's 110 operating system.

Submission Client

A submission client acts as a proxy for request submission to the HTAP project, for example the HTAP project 114 as shown in FIG. 1. For example, the submission client may request an HTAP project to commit a transaction or run some analytical function. We use the term proxy broadly to include, for example, an entity that performs an operation on behalf of another entity. Returning to FIG. 2, in some implementations, the submission client's 212 functions include:

Accepting a request 216 from a user 214 (e.g., a human operator or a process), and submitting that request 216 in the form of an HTAP request 218 through the request preprocessor 202 as a transactional or analytical request 224, 226 to the appropriate request engine 204, 206.

Accepting responses 228, 230 from a request engine 204, 206 to an HTAP request 224, 226 delivered on behalf of a user 214, and relaying those responses 228, 230 to the user 214.

To start a submission client 212, a copy of the HTAP software is run on a request submission capable node 110 that is acting as a client, sometimes referred to as being in client mode. Alternatively, a separate client program could be provided instead of running the same program in two different modes for the HTAP slice 116 and the submission client 212. The submission client 212 then waits for requests 216 from a user 214, either interactively or from another system through a programmatic interface.

The submission client 212 establishes communication with an appropriate slice 116, for example, by accessing connection details for slices 116: in some implementations, the submission client 212 has access to the federation configuration, for example, the federation configuration 132 shown in FIG. 7, which has a service handle 718 for each slice 116. A service handle 718 contains connection details that enable the submission client 212 to communicate with a particular slice 116. Such connection details could be, for instance, an IP address and port string. In some implementations, the connection details are implemented as a service handle understood by the MIOsoft MIOplexer software to facilitate communications (as described further in the Service Channel section below). In some implementations, the connection details are implemented as described above with respect to FIG. 7a.

Figure 8:
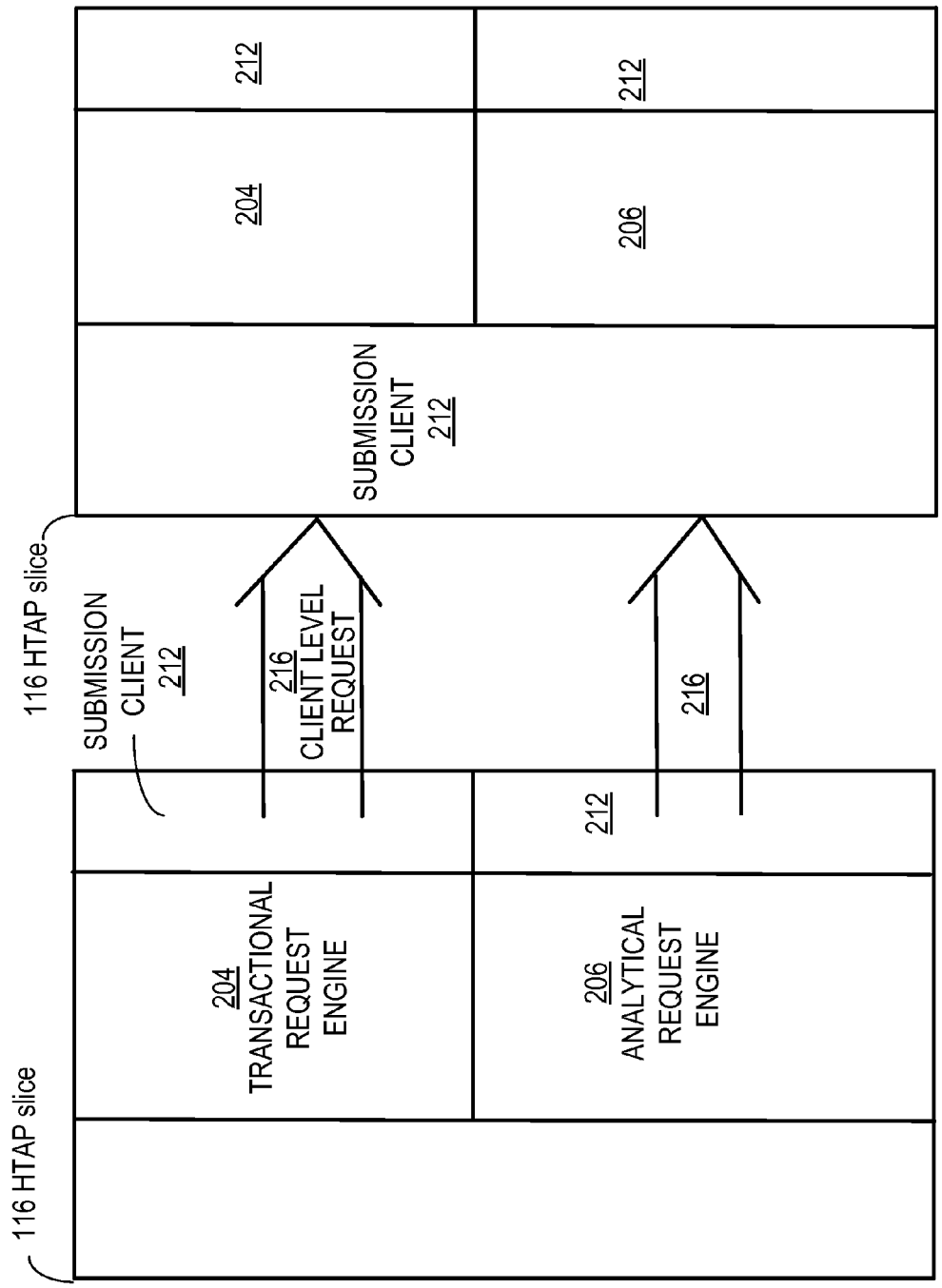

As shown in FIG. 8, in some implementations, components of the slice 116, including the request engines 204, 206, can employ a submission client 212 internally to programmatically create and submit additional client-level requests 216, The client-level requests 216 are submitted to the submission clients 212 of other slices 116. For example, the client-level requests could be lock requests to other slices 116, as further described below in the Request Preprocessor section and accompanying figures.

HTAP Requests

Returning to FIG. 2, in some implementations, an HTAP request 218 represents some action that the user 214 of a submission client 212 wants the system, for example the unified system 100 as shown in FIG. 1, to perform. The action potentially returns results. There are potentially many types of HTAP requests 218, including requests that retrieve and affect data, perform computation, perform systems operations, and perform maintenance. In some implementations, an HTAP request can be for a transaction to occur, for example, a transactional request 224, or for a result to be returned from an analytics calculation, for example, an analytical request 226.

Transactional requests 224 target specific data chunks within specific clusters, for example, the clusters 124 as shown in FIG. 1, and specify an action to perform on the data chunks, for example the object 115 as shown in FIG. 1. Some examples of actions a transactional request 224 might specify, if the data chunks were key-value pairs, include retrieving a value based on a key, creating a key-value pair, updating the value of a key-value pair, or deleting a key-value pair. From the point of view of a cluster 124 of data, at least actions that modify the cluster 124 are not necessarily able to be executed in parallel or with the constituent instructions interleaved. Some actions may be freely reordered, as long as the constituent instructions of multiple actions are not interleaved. These actions are known as commutative actions and must be run in serial order. For example, the result of performing two actions that add 3 to the current value, say 1, of a key-value pair will be 7 if run serially, but potentially a different value, such as 4, if run in parallel.

In some implementations, an InjectJobs request facilitates transactional requests 224. The actions that are performed as the result of an InjectJobs request are represented as jobs (as defined in the Persistent Data Storage Techniques patent). In some implementations, InjectJobs is a static instruction that includes the jobs that should be run. The InjectJobs request specifies types of jobs—such as CreateObject, DeleteObject and UpdateObject—that target clusters, and, in some implementations, existing objects in clusters. Many other job types are supported, and the details of many of these job types—including CreateObject, DeleteObject, and UpdateObject—are described in the Persistent Data Storage Techniques patent referenced earlier.

Analytical requests 226 retrieve some amount of the data persistently stored by the HTAP system 100, potentially across many clusters 124, and may perform some computation or aggregation on that data. For instance, one may wish to retrieve all values from key-value pairs across all clusters 124 in the entire system 100. Furthermore, if those values were integers, one may wish to compute the mean of all those integer values.

In some implementations, a ReportScan analytical request 226 retrieves all objects 115 of a certain type 117 from clusters 124 in the system 100. In some implementations, the object "type" is the class the object was instantiated from, as defined in the Object Model (e.g., Customer, Bill, or SensorEvent) as described in the Executing Algorithms In Parallel patent application referenced earlier.

Service Channel

Figure 9:
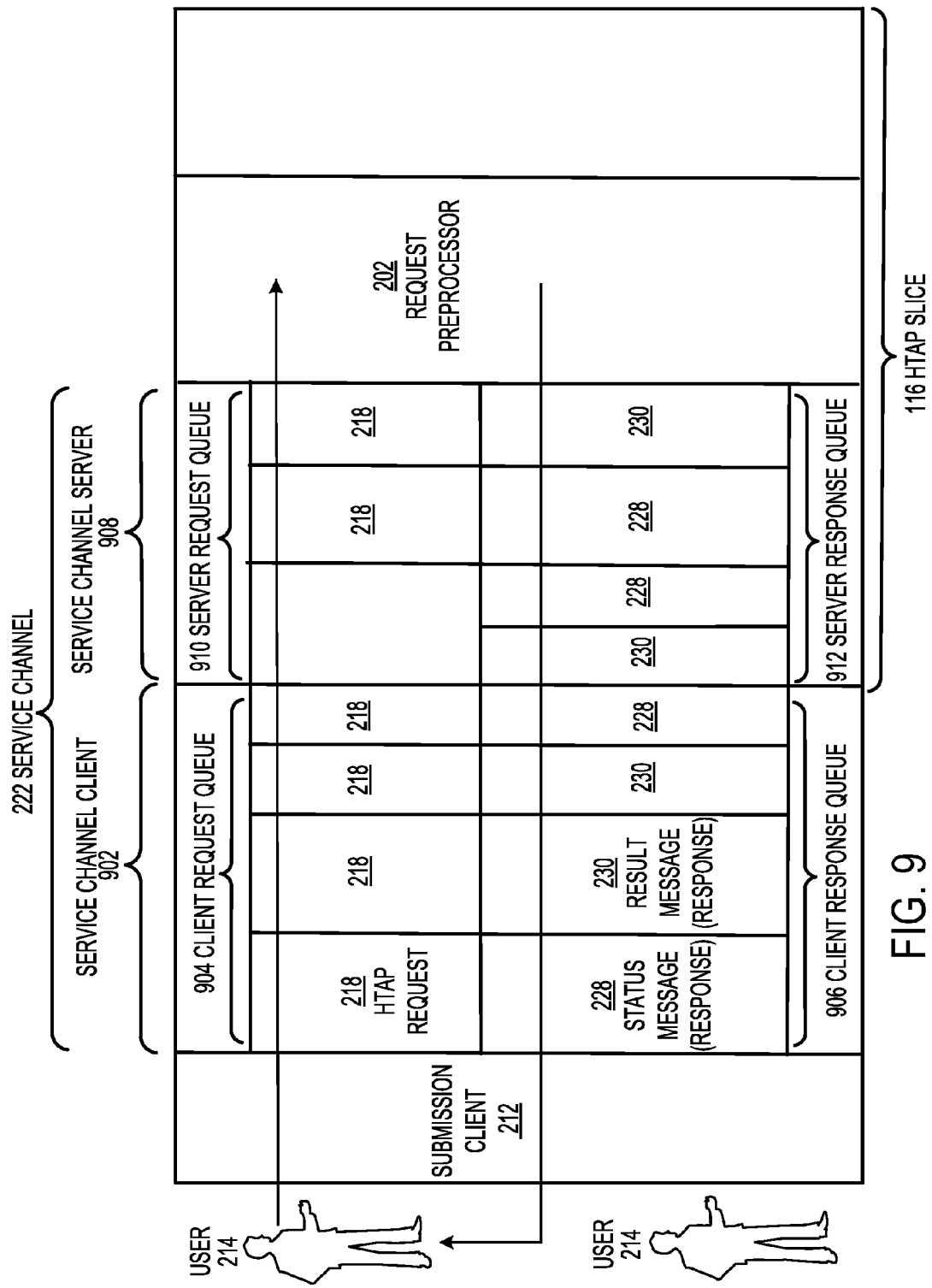

As shown in FIG. 9, in some implementations, the service channel 222 facilitates communication between a submission client 212 and a slice 116.

On the client side, the service channel client 902 maintains a queue 904 of HTAP requests 218 that are waiting to be delivered to the slice 116. In addition, the service channel client 902 maintains a queue 906 of responses 228, 230 from the slice 116 and dispatches the responses 228, 230 to the respective requesting users 214.

On the server side, the service channel server 908 on the slice 116, maintains a queue 910 of HTAP requests 218 that are waiting to be delivered to the request preprocessor 202 for the slice 116. In addition the service channel server 908 on the slice 116 maintains a queue 912 of responses 228, 230 from the request preprocessor 202 that are waiting to be delivered to the service channel client 902.

On the slice side, the service channel server 908 has two loops, a read loop and a write loop. The read loop receives new HTAP requests 218 from the service channel client 902 and maintains a queue 910 of HTAP requests 218 that have been received, but have yet to be processed by a request preprocessor 202. The write loop receives responses from the request preprocessor 202 about requests from the requesting submission client 212, and maintains a queue 912 of responses 228, 230 that are yet to be delivered to a requesting client (e.g., a human operator or a process) from the slice 116, using a service channel client 902, as described below.

On the client side, the service channel client 902 has two loops, a read loop and a write loop. The read loop receives requests from the submission client 212 and maintains a queue 904 of HTAP requests that have been received from the submission client 212, but have yet to be delivered to the service channel server 908. The write loop receives responses 228, 230 from the service channel server 908 and maintains a queue 906 of responses 228, 230 that have yet to be delivered to the submission client 212.

While the service channel 222 can operate using typical TCP/IP connections, in some implementations the service channel 222 uses the MIOsoft MIOplexer to handle communications. In such implementations, the service channel 222 communicates with a slice 116 by using an appropriate service handle, for example, the service handle 718 as shown in FIG. 7, for a service channel 222 for handling requests, sometimes known as a RequestServiceChannel. For example, a RequestServiceChannel identified by a ServiceHandleID as specified by the data contained in the client service handle 732 as shown in FIG. 7a, for that slice 116 as specified in a federation configuration, for example, as shown in FIG. 7a.

Request Preprocessor

Figure 10:
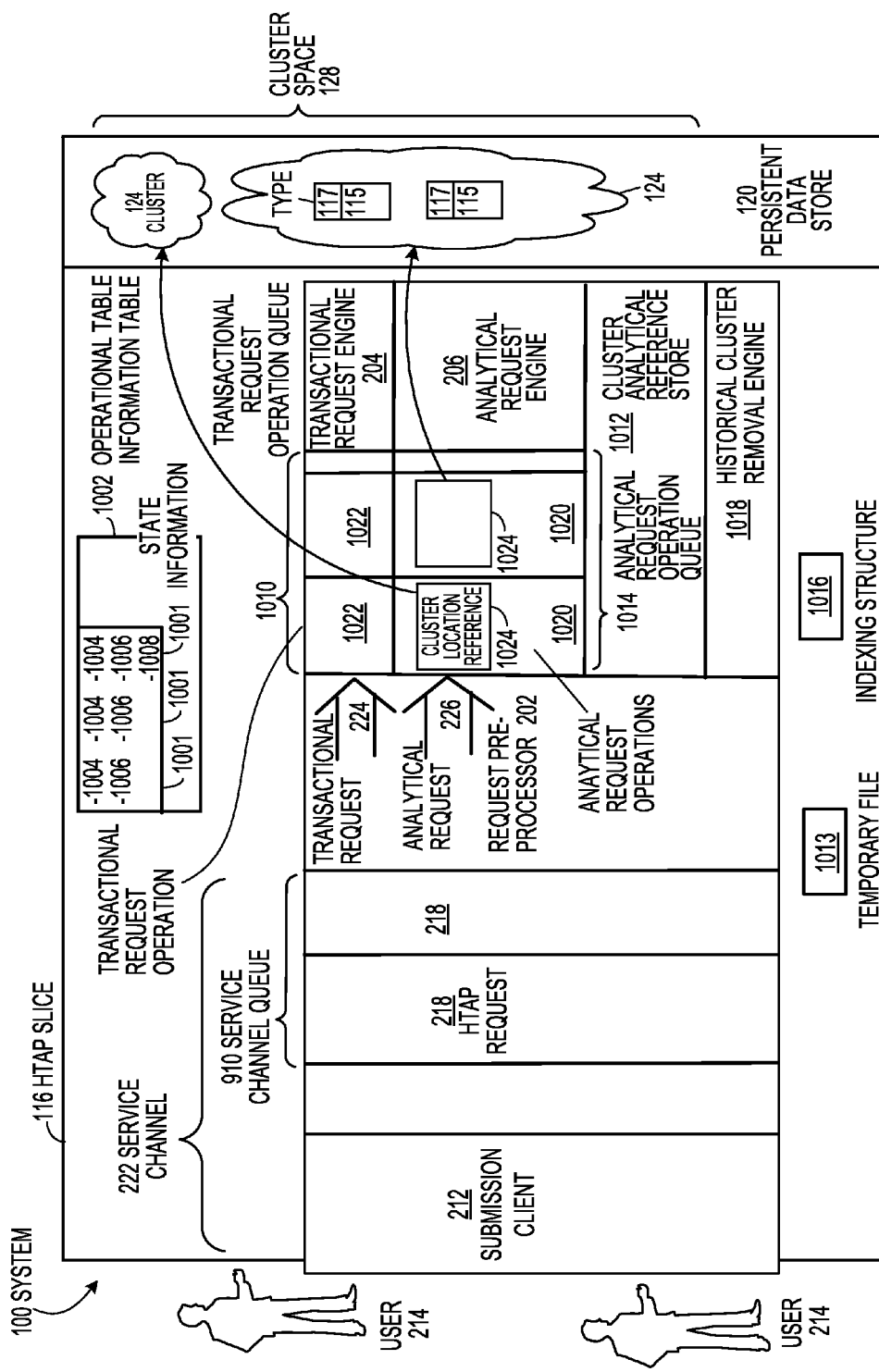

As shown in FIG. 10, in some implementations, the request preprocessor 202 preprocesses HTAP requests 218 waiting on the service channel queue 910. The request preprocessor 202 can perform operations required before the request 218 can be processed, including type-specific (e.g., transactional or analytic) request operations so that the request is available for and in a ready state for direct consumption by a type-specific request engine 204, 206, as further described below regarding transactional requests 224 and analytical requests 226. When the request preprocessor 202 has finished preprocessing an HTAP request 218, the requested operation or operations contained in the HTAP request 218 will be processed by a type-specific request engine 204, 206.

In addition, the request preprocessor 202 adds state information 1001 for the operation to an operation state information table 1002, a shared data structure, for example one of the shared data structures 232 as shown in FIG. 2. The operational state information table 1002 contains state information 1001 that contains status values 1004 and return values 1006 for each outstanding operation submitted to the request engines 204, 206. Result messages, for example the result messages 230 as shown in FIG. 2, and status messages, for example the status messages 228 as shown in FIG. 2, add context to the return values 1006 and status values 1004, respectively. For example, a return value 1006 resulting from some request could be the integer '1.' In the case of a transactional request, a corresponding result message could be SUCCESS, whereas in the case of an analytical request, a corresponding result message could be ResultOfComputation. The request preprocessor 202 notifies the submission client 212 using the service channel 222 after an HTAP request 218 is processed by one of the request engines 204, 206. The request preprocessor 202 potentially includes returned information 1008 from the originating HTAP request 218, and the request preprocessor 202 removes the state information 1001 for the operation from the operation state information table 1002.

For transactional requests 224, the request preprocessor 202 submits, to the transaction engine 204 for the slice 116, the operations that implement the transactional request 224 specified by the HTAP request 218. Because these operations, sometimes known as transaction request operations, might be commutative but not necessarily safe to interleave piecewise, and many requests for such operations may have arrived from the same or different users 214, the requested operations are added to a slice-wide shared queue for transactional requests 1010 or other ordered data structure. In some implementations, the operations that implement the transactional request 224 are run in series, and the slice-wide shared queue for transactional requests 1010 is sometimes known as a transactional request operations queue.

For analytical requests 226, the request 226 depends on some persistent data in a cluster 124 or the request 226 is a request for computation or both. In some implementations, a computation can depend on non-persistent data, but such data is not directly part of the transactional cluster system; rather it is some other data in memory or data stored persistently either inside or outside the persistent store 120.

If the analytical request 226 depends on persistent data in certain clusters 124, the request preprocessor 202 gets the locations of those clusters 124 from one or more cluster analytical reference stores 1012 on one or more slices 116. In some implementations, a slice 116 can contain more than one cluster analytical reference store 1012. Getting the locations is sometimes referred to as data location gathering. In some implementations, none, some, or all of the clusters 124 are located on the same slice 116 as the request preprocessor 202. For each slice 116 containing the locations, the request preprocessor 202 for that slice 116 locks the particular cluster analytical reference store or stores 1012 on that slice 116 that that request preprocessor 202 is interested in. This is useful to temporarily prevent updates, for example, by preemptive transactional requests running on the same slice 116. In some implementations, the lock on the cluster analytical reference store or stores 1012 is maintained during data location gathering, a relatively short period of time compared to the analytical operations, and the lock is released before the analytical operations begin retrieving data from the clusters 124. In some implementations, the clusters 124 do not get locked because each cluster 124 is operated on by a serial queue of transactions, e.g. the slice-wide shared queue for transactional requests 1010, whereby each transaction can run to completion in turn. Because transactions run serially and analytics run on a guaranteed consistent set of data, locks on the clusters 124 are not needed.

In some implementations, when locks are required on cluster analytical reference stores 1012 on more than one slice 116, an internal submission client 212 can be employed to make client-level requests, as further described above in the Submission Client section and accompanying figures. The lock is accomplished by taking a snapshot of the locations of relevant clusters 124 at a moment in time when the slice 116 is consistent (there are no partially written updates to the persisted data). Taking a snapshot is accomplished, for example, by reading the locations of the clusters 124, also known as references to values, the clusters 124 containing values that the request preprocessor 202 is interested in, then saving those locations to a temporary file 1013, or to memory, for example the internal memory 408 for transient data storage, as shown in FIG. 4. In this way, the transactions can continue, in what is sometimes known as an append-only manner, such that the most current locations of clusters 124 may change in a cluster analytical reference store 1012, but the gathered and stored locations may point to potentially older clusters 124, yet ones that represent a consistent point-in-time in the database. For example, a snapshot is taken of the references, or pointers, to the locations of the clusters where the needed data is stored. Then if changes need to occur to snapshotted clusters, a copy is made of the clusters, the changes are made to the copies, the copies are stored in new locations, and the appropriate cluster analytical reference stores are updated to point to the location of the new copies. The original clusters containing the data that was of interest remain stored in the snapshotted locations.

If the analytical request 226 is a request for computation only, the request preprocessor 202 does not have to do any locking or data location gathering, because the request 226 will not depend on stored data that could potentially be changed by a transactional request. For example, a request for computation only includes all data required to perform the computation within the request, e.g., a request to calculate digits 50 through 100 of the constant pi ($\pi$). This is useful for taking advantage of the features of the system 100 at times when the HTAP nodes are idle. For example, to perform computations that are not necessarily related to the transactional or analytical operations that operate on the data stored in the system 100. For example, an HTAP project may exist that refers to a particular database and transactional requests for that database. A user may also want to calculate many digits of pi. Each HTAP node could be utilized, when no transactional requests were running on that HTAP node, to submit analytical requests for computation only. For example, multiple analytical requests for computation only could be submitted, such that some or every HTAP node could use the processing power available to it to calculate some number of digits of pi using the BBD formula, as described, for example, at http://en.wikipedia.org/wiki/Bailey%E2%80%93Borwein%E2%80%93Plouffe_formula.

The request preprocessor 202 then adds the requested analytical request operations 1020, containing references 1024 to the locations of the clusters 124 of interest, to a slice-wide shared queue for analytical requests 1014, sometimes known as an analytical request operation queue, or other data structure. In some implementations, the data structure is a queue, however this data structure does not have to be ordered, or can be ordered in a way contrary to the order in which the analytical requests 226 were received.

In some implementations, as described in the Persistent Data Storage Techniques patent referenced earlier, the request preprocessor 202 can act as a proxy for a job creation process when processing transactional requests 224 if the requested operations are jobs that are intended for the transactional request engine 204.

Cluster Analytical Reference Store

As also shown in FIG. 10, in some implementations, the cluster analytical reference store 1012 maintains information about the physical locations of clusters 124 on a particular slice 116 that are related in some way. This relationship is usually broader than a 1-to-1 ratio. For example, clusters 124 can be related to one another based on object type, on data size, or on a timestamp. Such relationships are useful because they can be classified and therefore be indexed using some dimension. In the case of retrieving data from a single cluster 124, for example, in the case of a modified version of a transactional request 224 that only returns data chunks from a particular cluster 124, other indexing structures and mechanisms can be useful. The cluster analytical reference store 1012 can contain information about a potentially large number of clusters 124 that might be interesting, for example, clusters 124 that share some common characteristics. This is useful because some analytical transactions perform retrievals and computations that require data from broad passes over the database and benefit from being able to efficiently access clusters 124 that share common characteristics.

Examples of clusters that share some common characteristics include clusters that contain common data, or clusters that contain common metadata. In reference to the latter, a specific case would be clusters that contain data chunks of a certain type. We use the term metadata broadly to include, for example, information describing data, such as the data's type (e.g., object type or text) and length.

The cluster analytical reference store 1012 contains information that enables both functionality to retrieve all references to clusters 124 related in a certain way, and functionality to update the information in clusters 124 by adding references or removing references or both to clusters 124 related in a certain way. It is helpful to use an efficient data structure—such as a B+ tree, an example of a well-known data-structure—for retrieving a potentially large number of related items. In some implementations, other efficient data structures can be used.

In some implementations, the types 117 of objects 115 a cluster 124 contains are used for efficient access. The cluster analytical reference store 1012 for object types has a lookup mechanism that, given an object type 117 (e.g., Customer), will return the physical locations in the persistent data store 120, of all clusters 124 containing objects 115 of that type 117 on the slice 116. The lookup mechanism uses an indexing structure 1016 where the cluster locations of clusters 124 containing objects 115 of types 117 are keyed by a type hash that is unique (or nearly so) across all types 117. In some implementations, the cluster analytical reference store 1012 for object types contains an update mechanism to update the cluster 124 location references referenced by a type hash key. In some implementations, the physical locations are cluster spaces 128. In some implementations, the physical locations are the physical locations of the clusters 124, because more than one cluster 124 can be in a cluster space 128.

Transactional Request Engine

The transactional request engine 204 performs the operations that implement the transactions on a slice 116 by writing data that targets particular clusters 124; the operations are contained in one or many transactional request operations 1022. The act of storing data of certain clusters 124 persistently and thus bringing the slice 116 to a consistent state, at least momentarily, is known as a database transaction. In some implementations, a database transaction stores data persistently on a disk. In some implementations, a database transaction stores data persistently in memory or in transient storage.

A database transaction can contain the result of more than one transactional request operation 1022, for instance if the computed effect of several operations applied serially, for example as a sum, of the transactional request operations 1022, is needed in order for the state of the persistent data in the system 100 to be consistent, or to gain performance benefits from performing a single write instead of multiple writes (which is especially useful if the data is persisted to a spinning disk).

To maintain consistent historical representations of the persisted data (which is important in order to assure the consistency of the data being used by analytical operations, for example), the transactional request engine 204 writes a new copy of the changed cluster 124 to persistent storage, for example, the hard disk 410 as shown in FIG. 6, leaving the old version of the cluster 124 intact in the persistent data store 120. The writing of the new copy is sometimes known as appending. The new copy of the cluster 124 thus has a new physical location, and references to the location may need to be updated in various indices, for example the cluster analytical references stores, to reflect the new physical location. In some implementations, the new copy of the changed cluster 124 is written to transient storage.

Whenever the transactional request engine 204 runs, each database transaction is performed by processing transactional request operations 1022 from the shared transactional request operations queue 1010.

If the transactional request operations 1022 that run as part of a database transaction return data, such as a result, the transaction request engine 204 updates the state information 1001 for that particular transactional request operation 1022, along with updating the status value 1004 to indicate the operation 1022 was successfully completed, in the operational state information table 1002.

Whenever the transactional request engine 204 writes a database transaction, the transactional request engine 204 performs additional maintenance steps to update indices, for example, the indexing structure 1016. The maintenance steps include a step to help support the analytical workloads: the transactional request engine 204 updates information in the appropriate cluster analytical reference stores 1012 with a reference to the current location of clusters 124 that have information in them needed for the analytics supported by the analytical request engine 206.

In some implementations, as described in the Persistent Data Storage Techniques patent, the transactional request engine 204 is a modified Job Execution Process (JEP) that additionally updates information in the cluster analytical reference store for object types 1104.

In some implementations, a transaction log is maintained by the system 100. The transaction log can be used to ensure the integrity of the database, for example, in the event that a transactional request fails to run to completion or encounters an error condition. For example, if a transactional request is composed of multiple operations and the system 100 fails after the first operation modifies data in the database, the transaction log can be used to return the database to the state it was in prior to the execution of the first operation. This is sometimes known as performing a rollback. In some implementations, the transaction log is stored persistently for transactional operations that change or store data persistently in memory or in transient storage. In some implementations, the transaction log is stored persistently for transactional operations that change or store data persistently on disk.

Analytical Request Engine

When the analytical request engine 206 runs, the analytical request operations 1020 contained in the analytical request operations queue 1014 are run.

If an operation 1020 contains references to clusters 124 of data stored in persistent storage, for example the persistent storage 120 as shown in FIG. 2, the analytical request engine 206 begins visiting the clusters, that is, retrieving the clusters 124 from storage, for example the hard disk 410 as shown in FIG. 4. In some implementations, the analytical request engine 206 copies the entire contents of the clusters 124 into memory as they are retrieved, for example into the internal memory 408 for transient data storage as shown in FIG. 4. The analytical request engine 206 tracks which clusters 124 have been visited, and thus also which clusters 124 are left to be visited.

The analytical request engine 206 can make these clusters 124 available to the requestor 214, for example the respective user 214, including returning the clusters 124 directly using the service channel 222. However, because of the potential to return a large amount of data, an alternate mechanism is to put these clusters 124 in a shared data structure, for example, one of the shared data structures 232 as shown in FIG. 2, for later use, or persist the clusters 124 to some persistent data store, for example, the persistent storage 120 as shown in FIG. 2, at a location known by or returned to the requestor 214.

In addition to possibly retrieving persisted data, any computations in the operation 1020 will be run by the analytical request engine 206. Such operations might include accessing data not in persisted clusters 124, such as that retrieved by a previous analytical request engine 206 that is still located in the shared data structure, as explained above.

Because other processing on the slice 116, such as transactional request operations 1022, are higher priority than analytical request operations 1020, the analytical request engine 206 might need to be interrupted by a higher priority operation. During this interruption, some database transaction may change the persisted data in clusters 124 on the slice 116. To prevent returning a data set containing clusters 124 from times when the slice's 116 persisted data was in a different state, no updates to the cluster analytical reference stores' 1012 references to clusters 124, sometimes known as the list of references to clusters 124, for uncompleted analytical request operations 1020 are made. Instead, the analytical request operations 1020 processing is resumed when the interrupting operation completes. Because the references to clusters 124 are still valid locations of a copy of the cluster 124 from the state of the slice 116 at the point in time when the request preprocessor 202 retrieved the list of references to locations, even long running analytical request operations 1020 will retrieve a consistent view of the persisted cluster 124 data from the perspective of the slice 116.

Historical Cluster Removal Engine

Because the system 100 writes a new copy of a cluster 124 whenever the data in the cluster 124 changes (to assure the consistency of the data being used by analytical operations, for example), there will be a large number of historical copies of clusters 124 after an update-heavy system 100 has been running for some time, and these historical clusters 124 may us valuable space because the amount of persistent data storage 120 is finite. It is useful to delete some historical clusters 124 and allow that space to be re-used. We call this historical cluster removal, and it is performed by an historical cluster removal engine 1018.

There are several ways the historical cluster removal engine 1018 can determine whether a cluster 124 can be removed. In some implementations, the determinations can be implicit in that the historical cluster removal engine 1018 can look at all references to clusters 124 in indices 1016, including those references in the cluster analytical reference stores 1012, and remove those clusters 124 that are not currently referenced. In some implementations, the determinations can be explicit, in that functionality can be added to the transactional request engine 204 such that when an update is written to storage, clusters 124 are explicitly marked, for example marking the previous cluster version as "old". In some implementations, it is useful to reduce the number of writes to storage to decrease latency. Therefore, all clusters 124 can be marked to identify a version and each new cluster 124 has an incremented version number. Thus the historical cluster removal engine 1018 can remove all versions of a cluster 124 with version numbers that are less than the highest version number.

Another technique is to transactionally keep track not only of which regions of the files that hold transaction data are in use, but which regions are not in use. If multiple files are used, one can keep a separate but consistent accounting of how much space in each file is in use versus holding obsolete information, to determine which files should be visited for the purpose of evacuating the useful information to new (denser) files and then deleting the old files.

This process can be performed live on the system 100 by checking that there are no outstanding analytical request operations 1020, as those may have references to previous versions of a cluster 124.

Prioritization and Control Flow

Because an HTAP node, for example, the HTAP node 110 in FIG. 1, has finite resources, the work that needs to be performed by components and subcomponents of the system, for example the unified system 100 in FIG. 1, may need to be prioritized. For an online transaction processing system, transaction requests are often expected to be completed with relatively low-latency from the perspective of the user, so they should be prioritized. Users submitting analytical requests will also expect the request to complete at some point, even if users understand that theirs are high-latency type requests. Therefore, analytical requests should be completed at some point in time even if the system is under a heavy transactional request processing load.

Figure 11:
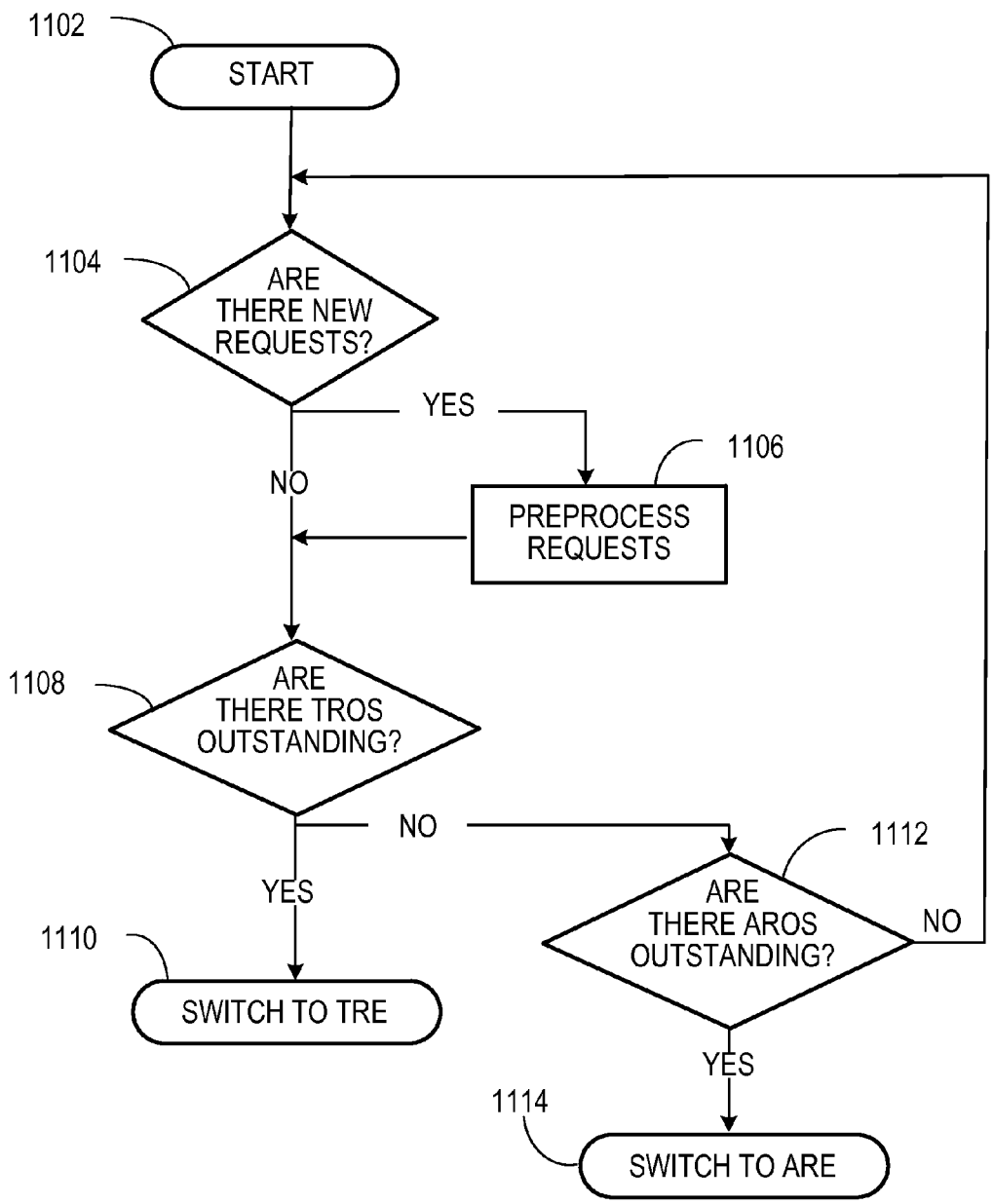

As shown in FIG. 11, in some implementations, to achieve this prioritization, after the request preprocessor starts 1102, it checks if there are new requests to preprocess 1104. If so, the request preprocessor preprocesses the requests 1106. If there are no new requests to process, or after the new requests are preprocessed, control is handed off to the transactional request engine and analytical request engine after checking if there are request operations outstanding: If there are transactional request operations outstanding 1108, processing control is switched to the transaction request engine 1110. Even if there are analytical request operations in the analytical request operations queue, if there are outstanding transactional request operations in the transactional request operations queue 1108, the processing control is always switched to the transactional request engine 1110 first after the incoming requests are preprocessed by the request preprocessor 1106. If there are no transactional request operations outstanding 1108, the request preprocessor 1106 checks if there are analytical request operations outstanding 1112. If so, processing control is switched to the analytical request engine 1114. If not, the request preprocessor loops back and checks if there are new requests to preprocess 1104 and then processing continues as above.

Figure 12:
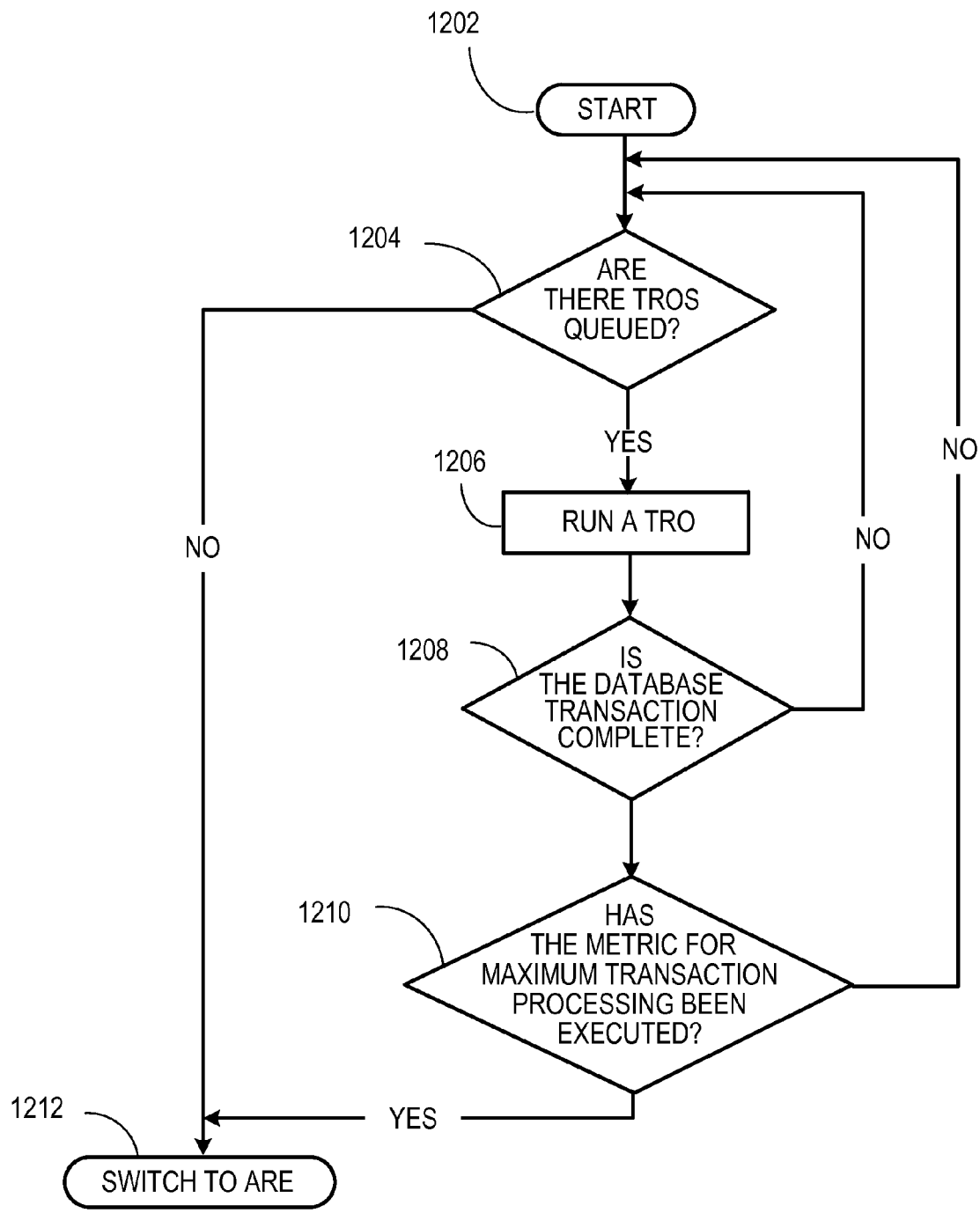

As shown in FIG. 12, in some implementations, the transactional request engine will hand processing control to the analytical request engine after some metric, sometimes referred to as a metric for maximum transaction processing, has been exceeded (examples described below) or if there are no more transactional request operations to perform. When performing database transactions, the transactional request engine will relinquish processor control only if the metric has been exceeded after a database transaction as a whole has been completed. The transactional request engine should not stop between individual transactional request operations within a database transaction. For example, when processing control is switched to the transactional request engine (as described above), after the transactional request engine starts 1202, it checks if there are operations on the transactional request operations queue 1204. If not, processing control is switched to the analytical request engine 1206, and processing continues as described below. If there are operations on the transactional request operations queue 1204, the transactional request engine runs a transactional request operation 1206, that is, or is part of, a database transaction, described above.

After the transactional request operation has been completed, the transactional request engine checks if the database transaction has been completed 1208. If not, the transactional request engine loops back to check if there are transactional request operations queued 1204 and processing continues as described above. If the database transaction is complete 1208, the transactional request engine checks if the metric for maximum transaction processing has been exceeded 1210. If it has, processing control is switched to the analytical request engine 1206, and processing continues as described below. If not, the transactional request engine loops back to check if there are transactional request operations queued 1204 and processing continues as described above.

Figure 13:
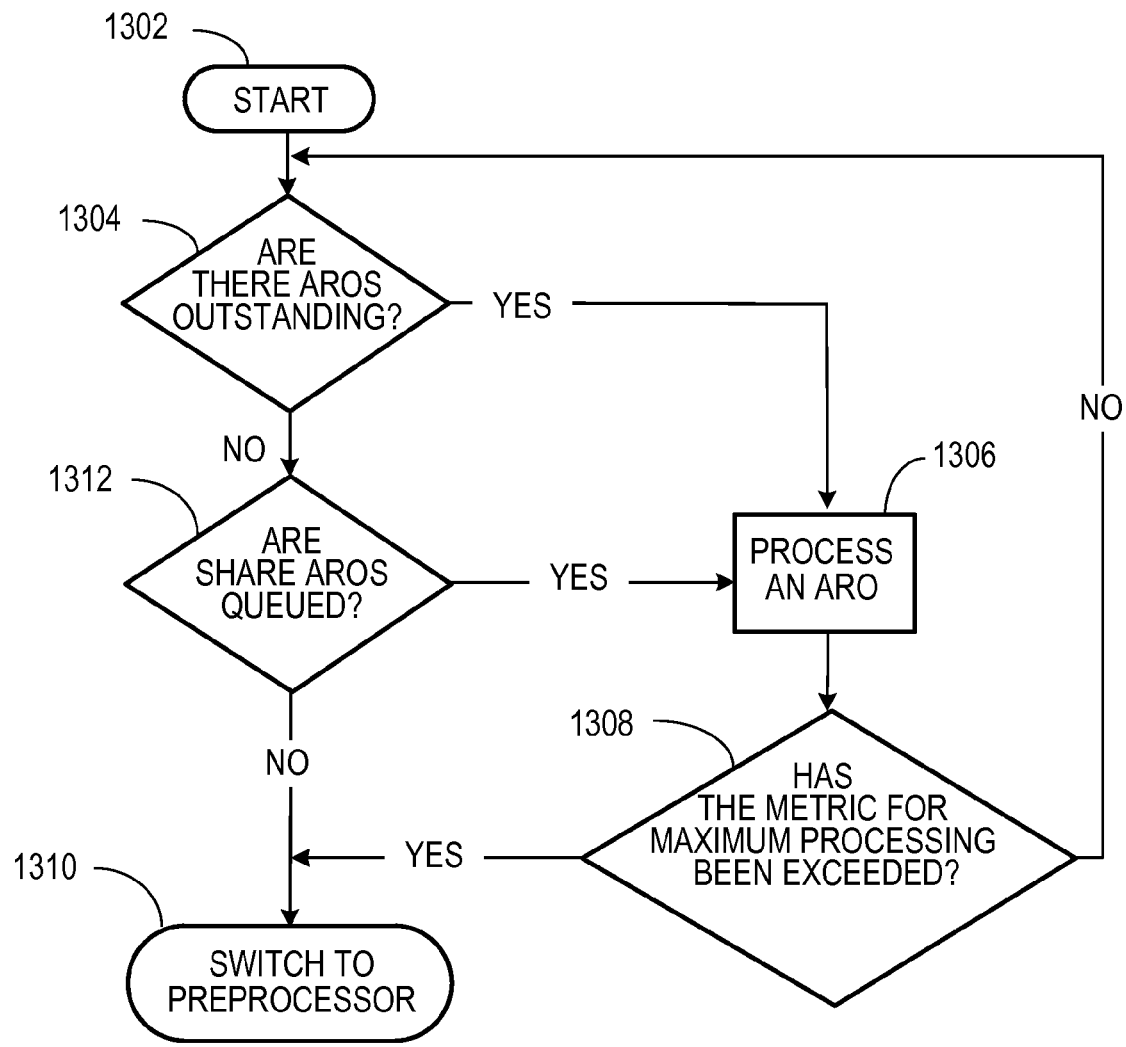

As shown in FIG. 13, in some implementations, the analytical request engine will hand off processing control to the request preprocessor after all analytical request operations have completed, or after some metric, sometimes referred to as a metric for maximum processing, has been exceeded (examples described below). For example, when processing control is switched to the analytical request engine (as described above), after the analytical request engine starts 1302, it checks if there are analytical request operations outstanding 1304. If so, the analytical request engine processes an analytical request operation 1306. If not, the analytical request engine proceeds to checking if there are analytical request operations queued 1312, as described below.

While processing the analytical request operation 1306, or after the analytical request operation is completed, if the metric for maximum processing has been exceeded 1308, processing control is switched to the request preprocessor 1310, and processing continues as described above for FIG. 11. If the metric for maximum processing has not been exceeded 1308, the analytical request engine loops back to check if there are analytical requests outstanding 1304 and processing proceeds as described above. If there are no analytical request operations outstanding 1304, the analytical request engine checks if there are analytical request operations queued in the analytical request operations queue 1312. If there are not, processing control is switched to the request preprocessor 1310, and processing continues as described above for FIG. 11. If there are analytical request operations queued in the analytical request operations queue, the analytical request engine processes an analytical request operation 1306, and processing continues as described above. In this way, metrics are used to decide when to cede control to another process, sometimes known as process switching, in a manner sometimes known as cooperative multitasking. In some implementations, preemptive multitasking is used for process switching.

Some example metrics for the analytical request engine include the amount of time that has passed, the number of clusters that have been retrieved, or a combination of both. Some example metrics for the transactional request engine include the number of transactions that have been run, the amount of time that has passed, the number of transactional request operations that have been processed, or a combination of any two or more of those.

In a multi-threaded implementation, the handing off of processing can be done in a variety of ways. One way is to have the transactional request engine and analytical request engine yield processing after the respective metric has been exceeded, thus causing execution to continue by the request preprocessor, which can invoke the other request engine.

Another implementation is to have the transactional request engine process and analytical request engine process have different process priorities, such that if two processes are eligible to run, the higher priority always runs until a higher priority process becomes eligible to run, or until the process blocks (say on a semaphore). In this type of implementation, it is important that both long running analytical tasks and incoming transactional tasks can both make progress. In some implementations, this is accomplished by first giving the analytical process higher priority than the transactional process, and then increasing the priority of the transactional task periodically such that it has higher priority than the analytical task for some period of time. For instance, every second the priority of the transactional process could be increased above the priority of the analytical process for 100 ms. This would ensure transactional job execution happens for about 10% of the time while there's outstanding requests to be processed. In this implementation, it may be important to not increase the priority of the transactional process above the priorities of the processes performing job delivery, so that new transactional jobs can be accepted and queued. However, the priorities of analytical processes might be increased above the priority of the processes performing job delivery to ensure progress for long-running analytical processes in the presence of large amounts of queued transactional jobs.

In some multi-threaded implementations, preemptive multitasking is used for process switching.

Because analytical request operations can run out of order, as described above, the request preprocessor or analytical request engine or both can change the order of analytical request operations to perform those requiring small amounts of data first. This is useful to optimize the latency percentage of the total time that an analytical request takes to return for relatively quick running analytical request operations.

In addition, the request preprocessor can hand off control to the historical cluster removal engine in the same fashion, and the historical cluster removal engine can work in a similar fashion: running until it has exceeded some metric. Some example metrics for the historical cluster removal engine include the number of clusters that have been removed, the amount of time that has passed, or a combination of both.

Other embodiments are within the scope of the following claims. For example, some or all of the database is in random access memory and some or all of the database is not persisted to disk. Some or all of the data is stored using other types of data structures than objects, such as KeyValues, or other data structures. The system could contain a single node with one or more slices. The system could contain other types of persistent storage, for example network attached storage that may or may not contain spinning disks, or other types of direct or indirectly attached non-volatile memories.

What is claimed is:

1. A computer-implemented method comprising
receiving requests for tasks to be executed with respect to data in a database, the tasks including tasks the execution of which corresponds to changes to be caused in data of the database,
receiving requests for other tasks that (a) are to be executed during periods that span the execution of two or more of the change-causing tasks and (b) must be executed on data in the database that is consistent time-wise as of specific times with respect to which the other tasks are to be executed, at least some of the data in the database for which the execution of the change-causing tasks would cause changes being data that must be available in the database and be consistent time-wise as of the specific times, and,
as the change-causing tasks are being executed and during the periods while the other tasks in the database are being executed, persistently maintaining the time-wise consistency of the data of the database as of the specific times, including, during those periods, (a) not changing in the database data that would be changed by the execution of the change-causing tasks, and (b) storing information about changes in the data to be caused by the corresponding execution of the change-causing tasks, without requiring a replication of data of the database that has not been caused to be changed by the execution of the change-causing tasks.

2. The method of claim 1 comprising executing the tasks on data located at two or more different nodes of the network.

3. The method of claim 1 comprising executing the tasks using two or more processes running at two or more different nodes connected by communication links.

4. The method of claim 1 in which at least a portion of the data is stored in transient memory.

5. The method of claim 1 in which the change-causing tasks are of relatively lower latency than are the other tasks.

6. The method of claim 1 in which the other tasks are of relatively higher latency than are the change-causing tasks.

7. The method of claim 1 in which the change-causing tasks comprise transactional tasks.

8. The method of claim 1 in which the other tasks comprise analytical tasks.

9. The method of claim 1 in which executing the other tasks while the change-causing tasks are being executed comprises persistently maintaining time-wise consistent versions of given data as the change-causing tasks cause changes in the given data.

10. The method of claim 9 in which executing the other tasks comprises reliably locating the time-wise consistent versions of data on which the other tasks are to be executed.

11. The method of claim 9 comprising removing time-wise consistent versions of the given data when the time-wise consistent versions are no longer needed for any of the other tasks.

12. The method of claim 1 in which at least two different items of the data are stored in two different non-conflicting regions or two different physical clusters.

13. The method of claim 12 comprising maintaining a relationship between the two different items of data, the relationship enabling a process that is executing one of the tasks to reach any one of the data items from the other data item.

14. The method of claim 13 comprising maintaining the consistency of the relationship notwithstanding updates of either or both of the data items.

15. The method of claim 1 comprising
at least two of the tasks having competing requirements for use of regions of the database, each of the regions including data that is all either locked or not locked for writing at a given time,
associating each of the regions with an available processor,
defining, for each of the tasks, jobs each of which requires write access to regions that are to be accessed by no more than one of the processors, and
distributing the jobs for concurrent execution by the associated processors.

16. The method of claim 1 in which each of the tasks is completed with a certainty that is at least as high as the certainty that a data update in a requested database transaction is not lost once the transaction is committed.

17. The method of claim 1 in which the tasks relate to commercial transactions.

* * * * *